(12) United States Patent
Azuma et al.

(10) Patent No.: US 10,761,439 B2
(45) Date of Patent: *Sep. 1, 2020

(54) POLYARYLATE RESIN AND ELECTROPHOTOGRAPHIC PHOTOSENSITIVE MEMBER

(71) Applicant: KYOCERA Document Solutions Inc., Osaka (JP)

(72) Inventors: Jun Azuma, Osaka (JP); Kensuke Okawa, Osaka (JP); Seiki Hasunuma, Osaka (JP); Tomofumi Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,759

(22) Filed: Aug. 4, 2017

(65) Prior Publication Data

US 2018/0046099 A1   Feb. 15, 2018

(30) Foreign Application Priority Data

Aug. 10, 2016  (JP) .................................. 2016-157136
Nov. 30, 2016  (JP) .................................. 2016-232079

(51) Int. Cl.
*G03G 5/06* (2006.01)
*G03G 5/05* (2006.01)
(Continued)

(52) U.S. Cl.
CPC ........... *G03G 5/056* (2013.01); *C08G 63/185* (2013.01); *C08G 63/189* (2013.01);
(Continued)

(58) Field of Classification Search
CPC ............. G03G 9/08724; G03G 5/0605; G03G 5/0609; G03G 5/06142; G03G 5/061473
See application file for complete search history.

(56) References Cited

U.S. PATENT DOCUMENTS 7,855,286 B2 * 12/2010 Otsubo ............... C09B 67/0016
                                                430/59.5
8,765,335 B2 *  7/2014 Tanaka ................... G03G 5/051
                                                399/111
(Continued)

FOREIGN PATENT DOCUMENTS

JP      S56-135844 A    10/1981
JP      2005-189716 A    7/2005
(Continued)

OTHER PUBLICATIONS

Japanese Patent Office machine-assisted English-language translation of JP 2017-146548 (pub. Aug. 2017). (Year: 2017).*

(Continued)

*Primary Examiner* — Christopher D Rodee
(74) *Attorney, Agent, or Firm* — Studebaker & Brackett PC

(57) ABSTRACT

An electrophotographic photosensitive member includes a photosensitive layer. The photosensitive layer contains a charge generating material, a hole transport material, and a binder resin. The binder resin contains a polyarylate resin represented by general formula (1). In general formula (1), r and s each represent an integer of at least 0 and no greater than 49 and t and u represents an integer of at least 1 and no greater than 50. Furthermore, r+s+t+u=100 and r+t=s+u. X and Y each represent, independently of one another, a divalent group represented by chemical formula (1-1), (1-2), (1-3), or (1-4).

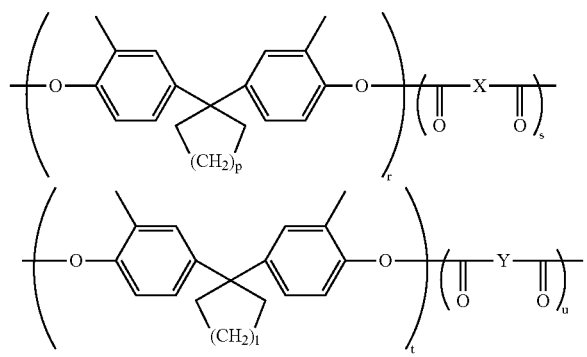

(1)

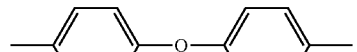

(1-1)

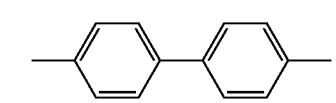

(1-2)

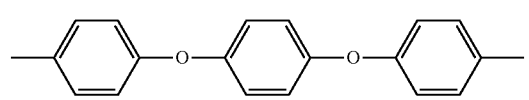

(1-3)

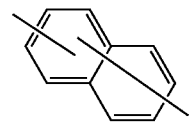

(1-4)

5 Claims, 5 Drawing Sheets

(51) Int. Cl.
*C08G 63/185* (2006.01)
*C08G 63/193* (2006.01)
*C08G 63/189* (2006.01)

(52) U.S. Cl.
CPC ......... *C08G 63/193* (2013.01); *G03G 5/0668* (2013.01); *G03G 5/0696* (2013.01); *G03G 5/06142* (2020.05); *G03G 5/061473* (2020.05)

(56) References Cited

U.S. PATENT DOCUMENTS

| | | | |
|---|---|---|---|
| 10,241,428 B2* | 3/2019 | Shimizu | G03G 5/0596 |
| 10,295,918 B2* | 5/2019 | Shimizu | G03G 5/0596 |
| 2004/0101771 A1* | 5/2004 | Azuma | G03G 5/05 |
| | | | 430/58.85 |
| 2008/0305418 A1* | 12/2008 | Hamasaki | G03G 5/0564 |
| | | | 430/78 |
| 2010/0290807 A1* | 11/2010 | Shimoyama | G03G 5/0614 |
| | | | 399/159 |
| 2014/0356773 A1* | 12/2014 | Azuma | G03G 5/047 |
| | | | 430/59.6 |
| 2015/0253682 A1* | 9/2015 | Azuma | G03G 5/04 |
| | | | 430/58.25 |
| 2017/0242352 A1* | 8/2017 | Ogaki | C08G 63/189 |
| 2018/0046098 A1* | 2/2018 | Shimizu | G03G 5/0596 |
| 2018/0046100 A1* | 2/2018 | Maruo | G03G 5/056 |
| 2018/0046101 A1* | 2/2018 | Shimizu | G03G 5/0539 |
| 2019/0025721 A1* | 1/2019 | Shimizu | G03G 5/0592 |
| 2019/0310562 A1* | 10/2019 | Tsurumi | G03G 5/0614 |

FOREIGN PATENT DOCUMENTS

| | | | | |
|---|---|---|---|---|
| JP | 2017-146548 A | * | 8/2017 | |
| WO | WO-2018079117 A1 | * | 5/2018 | ............... G03G 5/06 |

OTHER PUBLICATIONS

English language machine translation of WO 2018079117. (Year: 2018).*

* cited by examiner

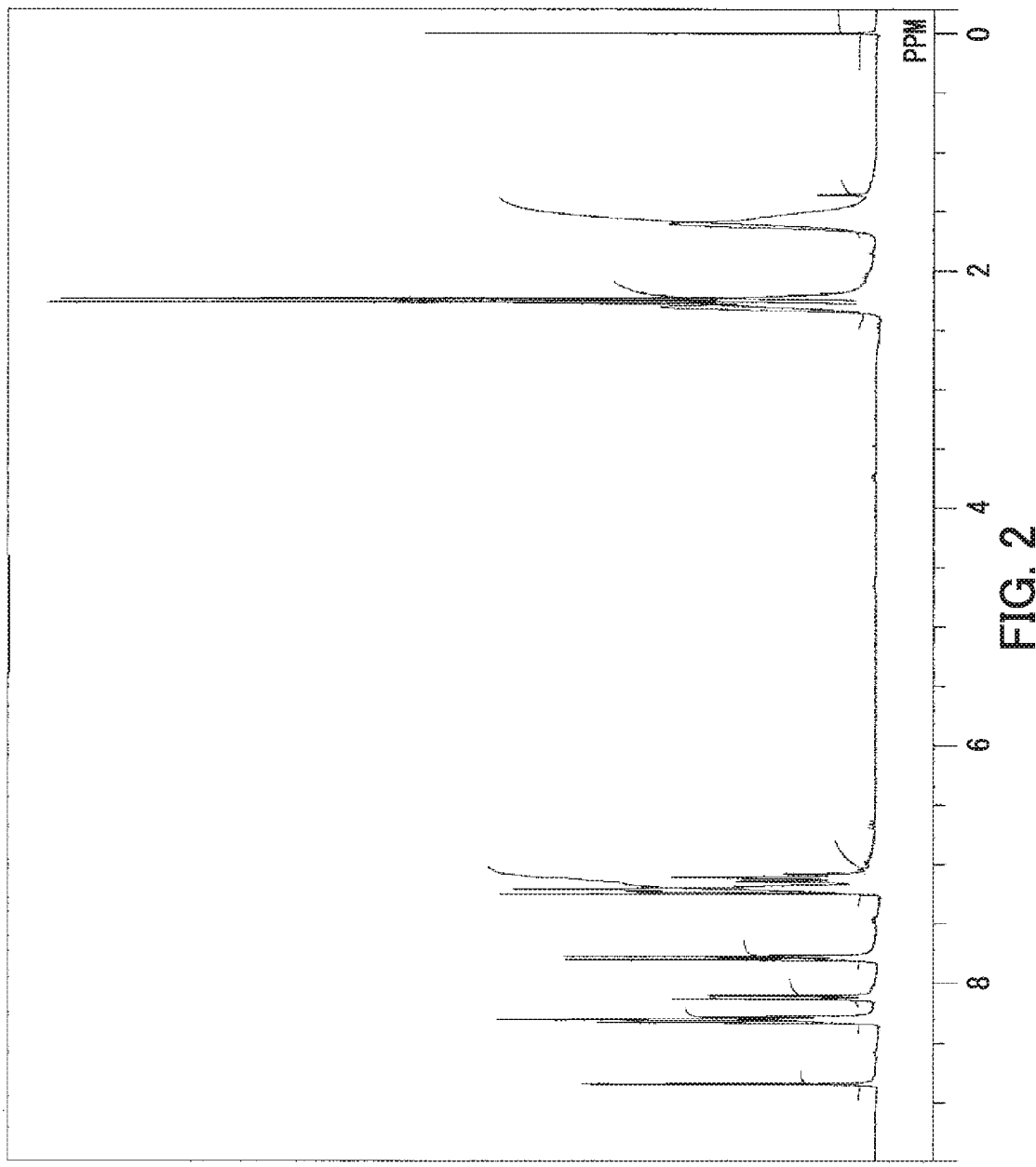

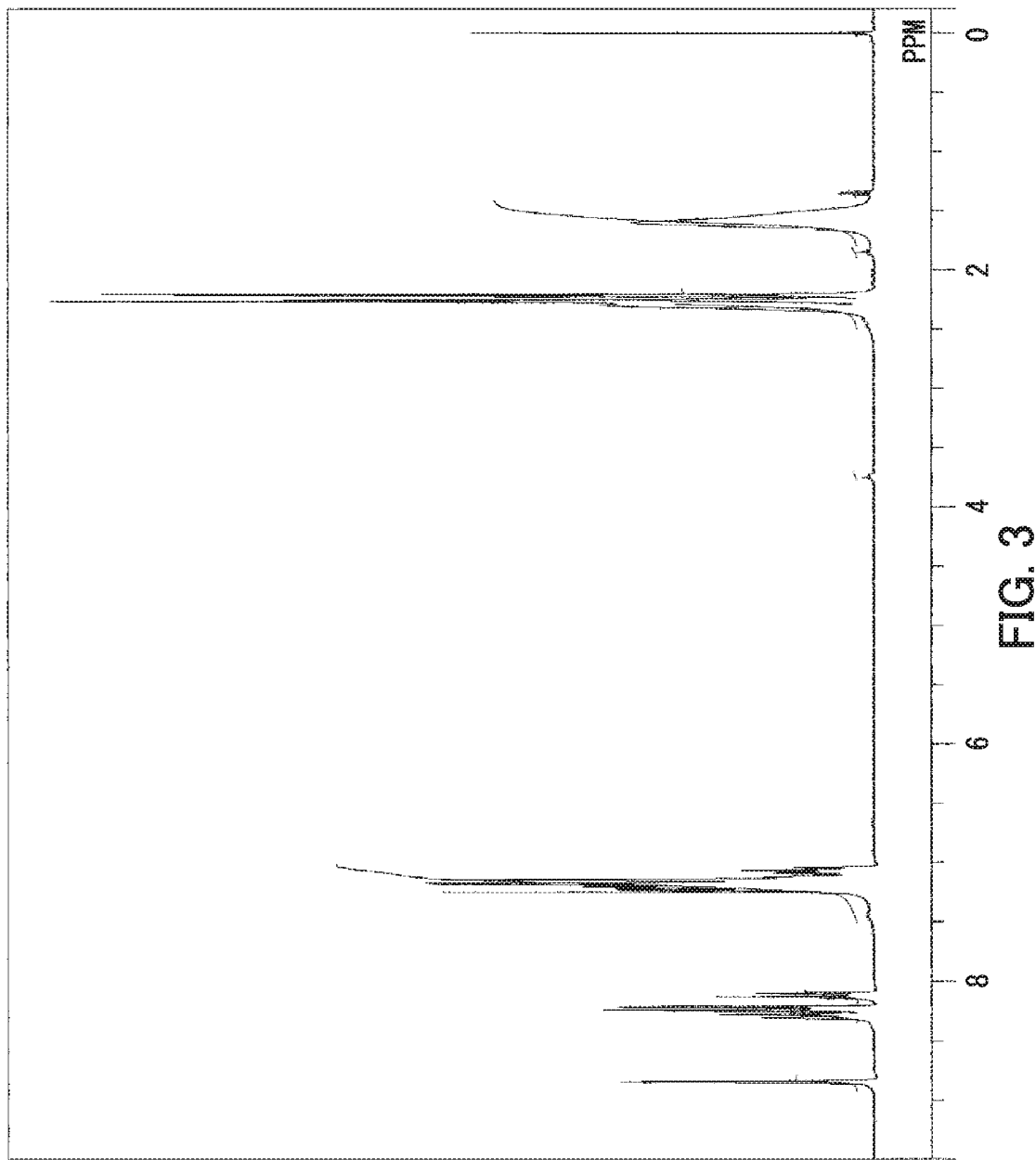

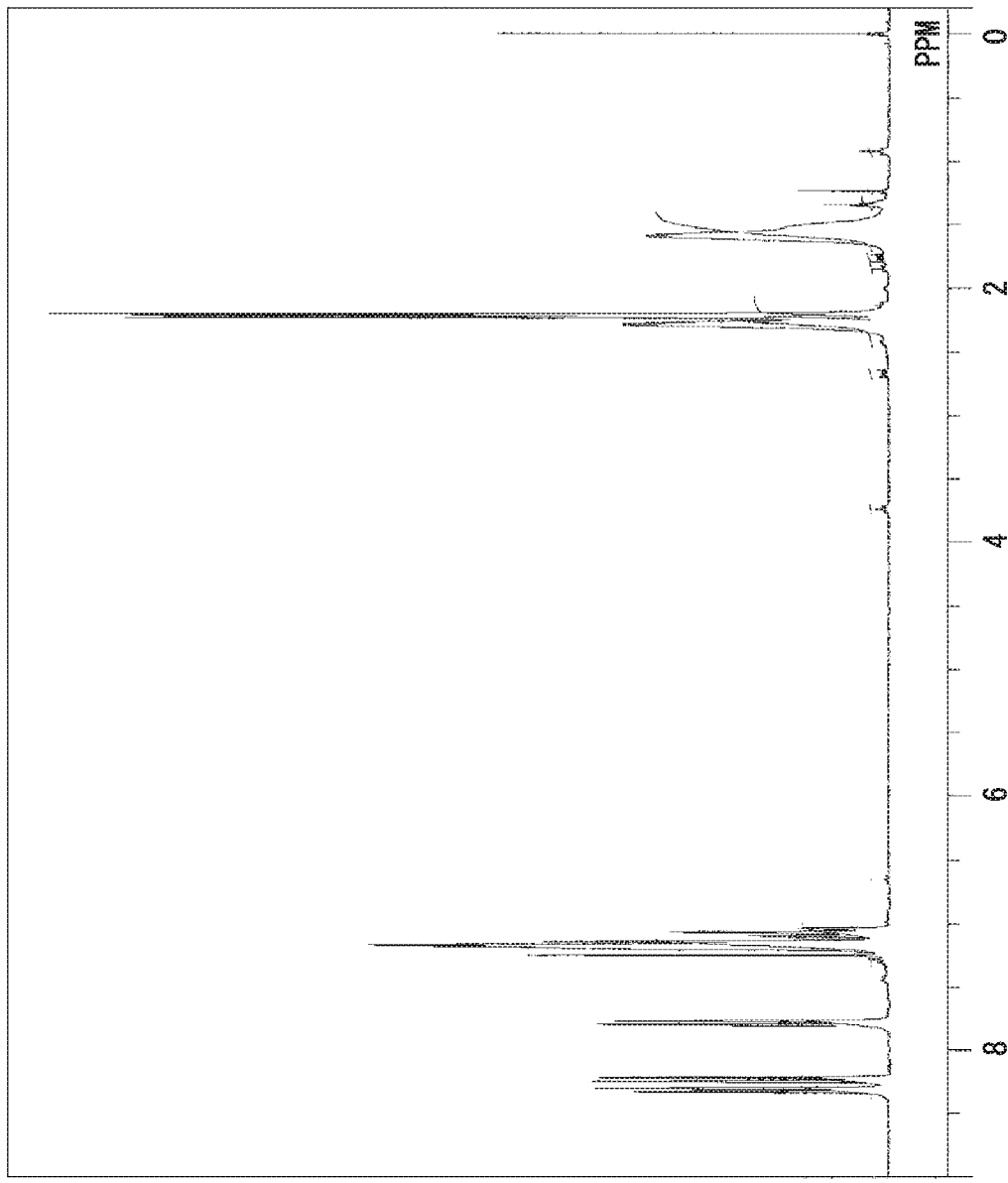

POLYARYLATE RESIN AND ELECTROPHOTOGRAPHIC PHOTOSENSITIVE MEMBER

INCORPORATION BY REFERENCE

The present application claims priority under 35 U.S.C. § 119 to Japanese Patent Application No. 2016-157136, filed on Aug. 10, 2016 and Japanese Patent Application No. 2016-232079, filed on Nov. 30, 2016. The contents of these applications are incorporated herein by reference in their entirety.

BACKGROUND

The present disclosure relates to a polyarylate resin and an electrophotographic photosensitive member.

Electrophotographic photosensitive members are used as image bearing members in electrographic image forming apparatuses (for example, printers and multifunction peripherals). An electrophotographic photosensitive member includes a photosensitive layer. Examples of the electrophotographic photosensitive member include a single-layer electrophotographic photosensitive member and a multi-layer electrophotographic photosensitive member. The single-layer electrophotographic photosensitive member includes a photosensitive layer having a charge generation function and a charge transport function. The multi-layer electrophotographic photosensitive member includes a photosensitive layer including a charge generating layer having a charge generation function and a charge transport layer having a charge transport function.

A polyarylate resin including a repeating unit represented by the following chemical formula (E-1) has been known. An electrophotographic photosensitive member containing the above polyarylate resin has been also known.

A polyarylate resin including a repeating unit represented by the following chemical formula (E-2) has been known. An electrophotographic photosensitive member containing the above polyarylate resin has been also known.

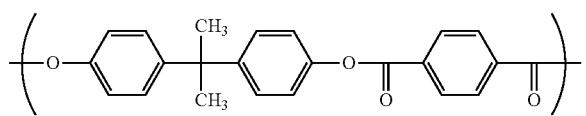
(E-1)

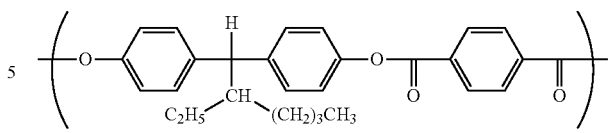
(E-2)

SUMMARY

A polyarylate resin according to the present disclosure is represented by general formula (1).

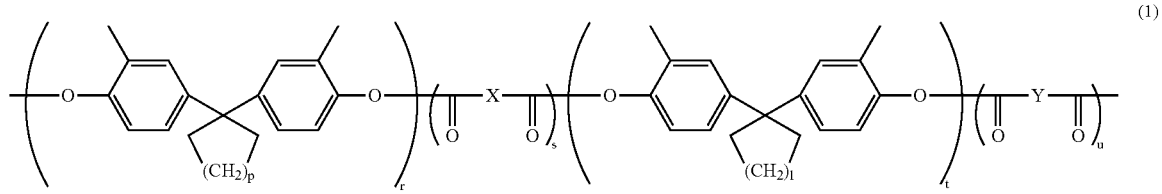
(1)

In general formula (1), p and l each represent, independently of one another, 2 or 3. Also, r and s each represent an integer of at least 0 and no greater than 49 and t and u each represent an integer of at least 1 and no greater than 50. Furthermore, $r+s+t+u=100$ and $r+t=s+u$. X and Y each represent, independently of one another, a divalent group represented by chemical formula (1-1), (1-2), (1-3), or (1-4).

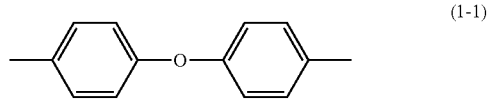
(1-1)

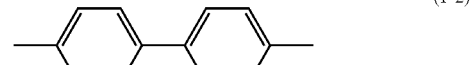
(1-2)

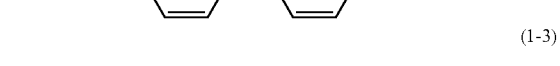
(1-3)

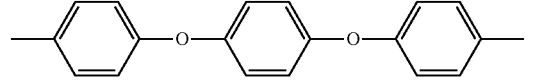
(1-4)

An electrophotographic photosensitive member according to the present disclosure includes a conductive substrate and a photosensitive layer. The photosensitive layer contains a charge generating material, a hole transport material, and a binder resin. The binder resin contains the above polyarylate resin.

BRIEF DESCRIPTION OF THE DRAWINGS

FIG. 2 is a $^1$H-NMR spectrum of a polyarylate resin represented by chemical formula (Resin-1).

FIG. 3 is a ¹H-NMR spectrum of a polyarylate resin represented by chemical formula (Resin-2).

FIG. 4 is a ¹H-NMR spectrum of a polyarylate resin represented by chemical formula (Resin-3).

DETAILED DESCRIPTION

Figure 1A:
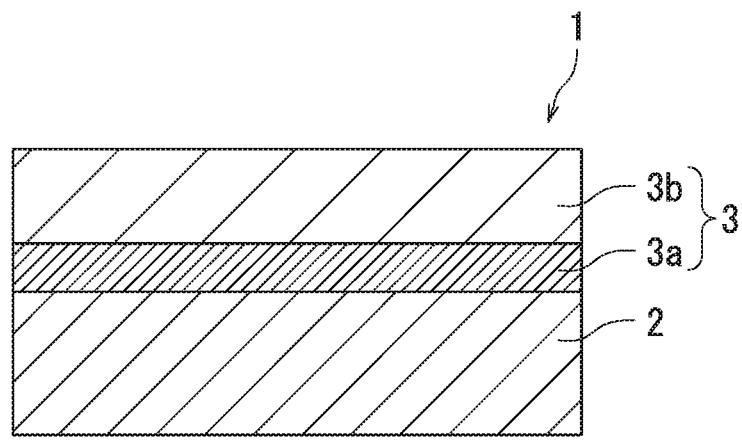
FIGS. 1A, 1B, and 1C each are a schematic cross-sectional view illustrating a configuration of an electrophotographic photosensitive member according to an embodiment of the present disclosure.

The following provides detailed explanation of embodiments of the present disclosure. However, the present disclosure is of course not limited by the embodiments and appropriate alterations within the intended scope of the present disclosure can be made when implementing the present disclosure. Although explanation is omitted as appropriate in some instances in order to avoid repetition, such omission does not limit the essence of the present disclosure. In the present description, the term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof.

Here, an alkyl group having 1 to 8 carbon atoms, an alkyl group having 1 to 6 carbon atoms, an alkyl group having 1 to 4 carbon atoms, an alkyl group having 1 to 3 carbon atoms, an alkoxy group having 1 to 8 carbon atoms, an alkoxy group having 1 to 4 carbon atoms, and a cycloalkane having 5 to 7 carbon atoms each refer to the following unless otherwise stated.

The alkyl group having 1 to 8 carbon atoms refers to an unsubstituted straight chain or branched chain alkyl group. Examples of the alkyl group having 1 to 8 carbon atoms include a methyl group, an ethyl group, a propyl group, an isopropyl group, an n-butyl group, an s-butyl group, a t-butyl group, a pentyl group, an isopentyl group, a neopentyl group, a hexyl group, a heptyl group, and an octyl group.

The alkyl group having 1 to 6 carbon atoms refers to an unsubstituted straight chain or branched chain alkyl group. Examples of the alkyl group having 1 to 6 carbon atoms include a methyl group, an ethyl group, a propyl group, an isopropyl group, an n-butyl group, an s-butyl group, a t-butyl group, a pentyl group, an isopentyl group, a neopentyl group, and a hexyl group.

The alkyl group having 1 to 4 carbon atoms refers to an unsubstituted straight chain or branched chain alkyl group. Examples of the alkyl group having 1 to 4 carbon atoms include a methyl group, an ethyl group, a propyl group, an isopropyl group, an n-butyl group, an s-butyl group, and a t-butyl group.

The alkyl group having 1 to 3 carbon atoms refers to an unsubstituted straight chain or branched chain alkyl group. Examples of the alkyl group having 1 to 3 carbon atoms include a methyl group, an ethyl group, a propyl group, and an isopropyl group.

The alkoxy group having 1 to 8 carbon atoms refers to an unsubstituted straight chain or branched chain alkoxy group. Examples of the alkoxy group having 1 to 8 carbon atoms include a methoxy group, an ethoxy group, an n-propoxy group, an isopropoxy group, an n-butoxy group, an s-butoxy group, a t-butoxy group, a pentyloxy group, an isopentyloxy group, a neopentyloxy group, a hexyloxy group, a heptyloxy group, and an octyloxy group.

The alkoxy group having 1 to 4 carbon atoms refers to an unsubstituted straight chain or branched chain alkoxy group. Examples of the alkoxy group having 1 to 4 carbon atoms include a methoxy group, an ethoxy group, an n-propoxy group, an isopropoxy group, an n-butoxy group, an s-butoxy group, and a t-butoxy group.

The cycloalkane having 5 to 7 carbon atoms refers to an unsubstituted cycloalkane having 5 to 7 carbon atoms. Examples of the cycloalkane having 5 to 7 carbon atoms include cyclopentane, cyclohexane, and cycloheptane.

<First Embodiment: Polyarylate Resin>

A polyarylate resin according to a first embodiment of the present disclosure is represented by the following general formula (1). The polyarylate resin as above is also referred to below as a polyarylate resin (1).

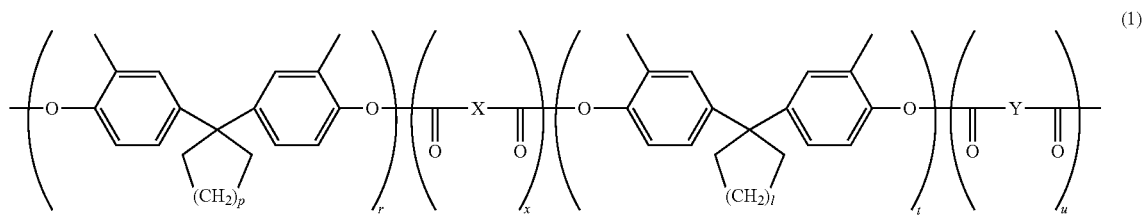

(1)

In general formula (1), p and l each represent, independently of one another, 2 or 3. Also, r and s each represent an integer of at least 0 and no greater than 49 and t and u each represent an integer of at least 1 and no greater than 50. Further, r+s+t+u=100 and r+t=s+u. X and Y each represent, independently of one another, a divalent group represented by chemical formula (1-1), (1-2), (1-3), or (1-4).

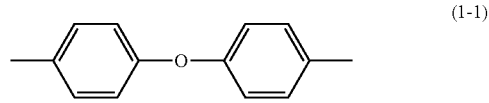

(1-1)

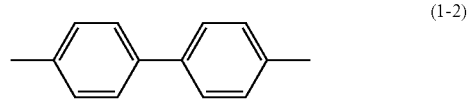

(1-2)

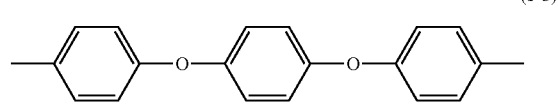

(1-3)

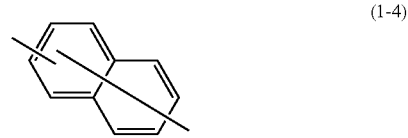

(1-4)

X and Y may be the same or different from each other, and p and l may be the same or different from each other. The phrase "p and l are different from each other" means that either one of p and l represents 2 and the other of p and l represents 3. It is possible that r and s are different from each other and r and u are different from each other. It is also possible that r and s are different from each other and t and u are different from each other.

Preferably, X and Y each represent, independently of one another, a divalent group selected from the group consisting of general formulas (1-1), (1-2), and (1-3). Further preferably, X and Y are different from each other.

Either one of X and Y preferably represents a divalent group represented by general formula (1-4) in terms of improving abrasion resistance of a photosensitive member.

The polyarylate resin (1) includes a repeating unit represented by chemical formula (1-5) (also referred to below as a repeating unit (1-5)), a repeating unit represented by general formula (1-7) (also referred to below as a repeating unit (1-7)), a repeating unit represented by general formula (1-6) (also referred to below as a repeating unit (1-6)), and a repeating unit represented by general formula repeating (1-8) (also referred to below as a repeating unit (1-8). A mole fraction between the repeating units (1-5) and (1-6) is represented by r/(r+t). A mole fraction between the repeating units (1-7) and (1-8) is represented by s/(s+u). That is, the polyarylate resin (1) includes the repeating units (1-7) and (1-8) where r and s each represent 0. The polyarylate resin (1) further includes the repeating units (1-5) and (1-6) in addition to the repeating units (1-7) and (1-8) where r and s each represent an integer of at least 1.

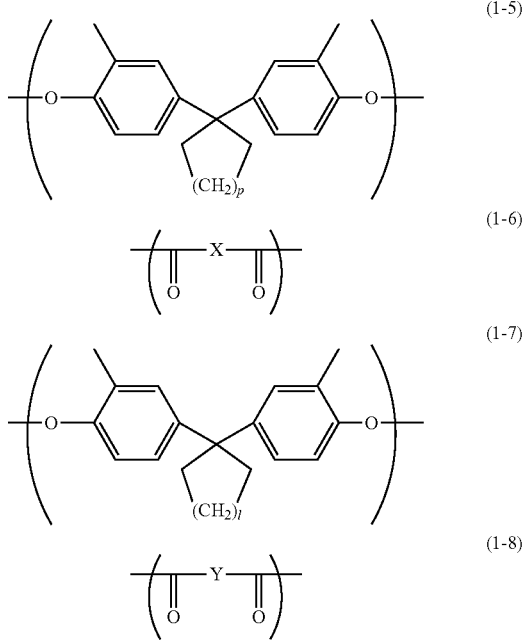

Note that p in general formula (1-5), X in general formula (1-6), l in general formula (1-7), and Y in general formula (1-8) represent the same as p, X, l, and Y in general formula (1), respectively.

The polyarylate resin (1) may include only the repeating units (1-5)-(1-8) where r and s each represent an integer of at least 1. Alternatively, the polyarylate resin (1) may include another repeating unit in addition to the repeating units (1-5)-(1-8). A ratio (mole fraction) of a total amount of the repeating units (1-5)-(1-8) relative to a total amount of all repeating units in the polyarylate resin (1) is preferably at least 0.80, more preferably 0.90, and further preferably 1.00.

No particular limitations are placed on arrangement of the repeating units (1-5)-(1-8) in the polyarylate resin (1) as long as repeating units derived from aromatic diols are each located adjacent to a repeating unit derived from an aromatic dicarboxylic acid. For example, the repeating unit (1-5) is located adjacent and bonded to the repeating unit (1-6) or (1-8). Similarly, the repeating unit (1-7) is located adjacent and bonded to the repeating unit (1-6) or (1-8). The polyarylate resin (1) may include another repeating unit in addition to the repeating units (1-5)-(1-8).

Also, r and s in general formula (1) each represent an integer of at least 0 and no greater than 49 and t and u each represent an integer of at least 1 and no greater than 50. Furthermore, r+s+t+u=100 and r+t=s+u. Yet, r/(r+t) is preferably at least 0.00 and no greater than 0.90, and more preferably at least 0.20 and no greater than 0.80. Still, s/(s+u) is preferably at least 0.00 and no greater than 0.90, and more preferably at least 0.20 and no greater than 0.80. Note that r/(r+t) represents a ratio (mole fraction) of the mass of the repeating unit (1-5) relative to a total mass of the repeating units (1-5) and (1-7) in the polyarylate resin (1). In a configuration in which r/(r+t) is at least 0.20 and no greater than 0.80, the photosensitive member is excellent in abrasion resistance. Note that s/(s+u) represents a ratio (mole fraction) of the mass of the repeating unit (1-6) relative to a total mass of the repeating units (1-6) and (1-8) in the polyarylate resin (1). In a configuration in which s/(s+u) is at least 0.20 and no greater than 0.80, the photosensitive member tends to reduce in abrasion resistance.

The polyarylate resin (1) preferably has a viscosity average molecular weight of at least 10,000 in view of abrasion resistance, more preferably greater than 20,000, further preferably greater than 30,000, and particularly preferably greater than 45,000. In a configuration in which the polyarylate resin (1) has a viscosity average molecular weight of at least 10,000, the polyarylate resin (1) has increased abrasion resistance with a result that a charge transport layer hardly abrades. By contrast, the polyarylate resin (1) preferably has a viscosity average molecular weight of no greater than 80,000, and more preferably no greater than 51,000. In a configuration in which the polyarylate resin (1) has a viscosity average molecular weight of no greater than 80,000, the polyarylate resin (1) readily dissolves in a solvent in charge transport layer formation, thereby achieving easy formation of a charge transport layer.

No particular limitations are placed on a production method of the polyarylate resin (1) as long as the polyarylate resin (1) can be produced. An example of the production method is condensation polymerization of aromatic diols and aromatic dicarboxylic acids for forming the repeating units of the polyarylate resin (1). No particular limitations are placed on synthesis of the polyarylate resin (1) and any known synthesis (specific examples include solution polymerization, melt polymerization, and interface polymerization) can be employed. Here, the aromatic dicarboxylic acids may each be replaced by an aromatic dicarboxylic acid derivative (specific examples include halogenated alkanol and dicarboxylic acid anhydride).

The aromatic dicarboxylic acids each have two carboxyl groups and are represented by respective general formulas (1-9) and (1-10). X in general formula (1-9) and Y in general formula (1-10) represent the same as X and Y in general formula (1), respectively.

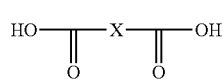  (1-9)

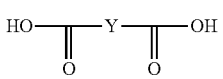  (1-10)

Examples of the aromatic dicarboxylic acids include aromatic dicarboxylic acids each having two carboxyl groups bonded on an aromatic ring (specific examples include 2,6-naphthalene dicarboxylic acid, 4,4'-dicarboxydiphenyl ether, and 4,4'-dicarboxybiphenyl). Note that the aromatic dicarboxylic acids can be each used as a derivative such as acid dichloride, dimethyl ester, or diethyl ester in synthesis of the polyarylate resin (1). The aromatic dicarboxylic acids may include another aromatic dicarboxylic acid (for example, terephthalic acid or isophthalic acid) in addition to the aromatic dicarboxylic acids represented by respective general formulas (1-9) and (1-10).

The aromatic diols each have two phenolic hydroxyl groups and are represented by general formula (1-11) and general formula (1-12). Note that p in general formula (1-11) and l in general formula (1-12) represent the same as p and l in general formula (1), respectively.

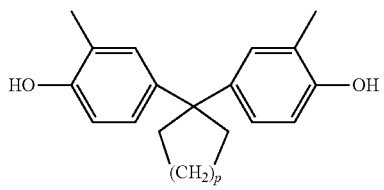  (1-11)

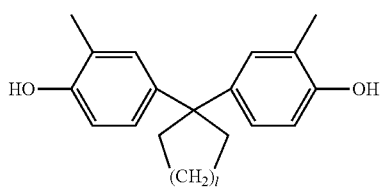  (1-12)

Examples of the aromatic diols include 1,1-bis(4-hydroxyphenyl)cyclohexane and 1,1-bis(4-hydroxyphenyl)cyclopentane. In a situation in which the polyarylate resin (1) is synthesized, the aromatic diols can be each used as a derivative such as diacetate. The aromatic diols may include another aromatic diol (for example, bisphenol A, bisphenol S, bisphenol E, or bisphenol F) in addition to the respective aromatic diols represented by general formula (1-11) and general formula (1-12).

Examples of the polyarylate resin (1) include polyarylate resins represented by chemical formulas (Resin-1)-(Resin-17) (also referred to below as polyarylate resins (Resin-1)-(Resin-17), respectively).

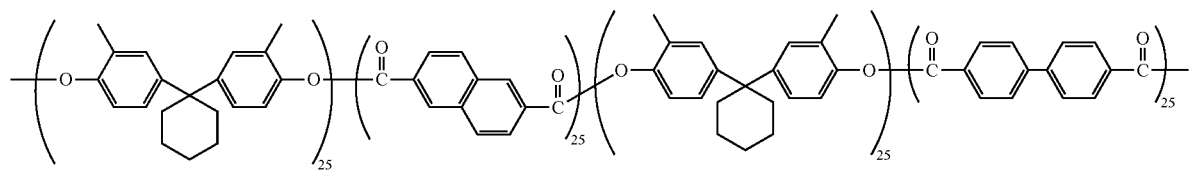

(Resin-1)

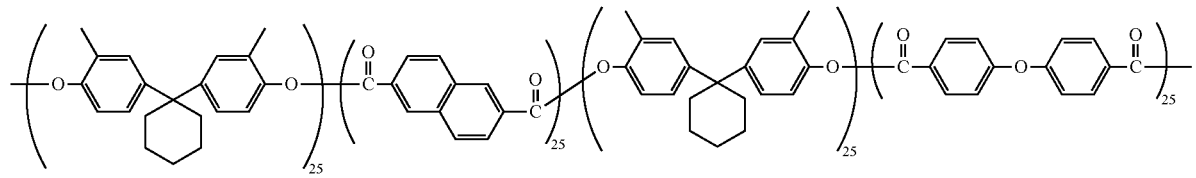

(Resin-2)

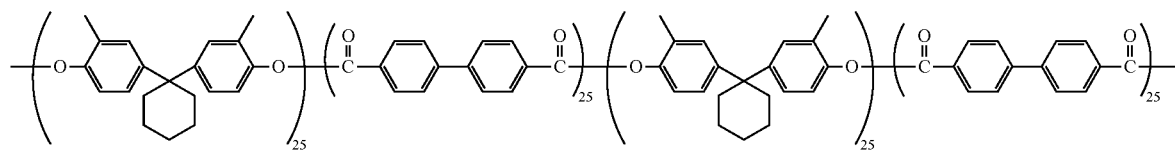

(Resin-3)

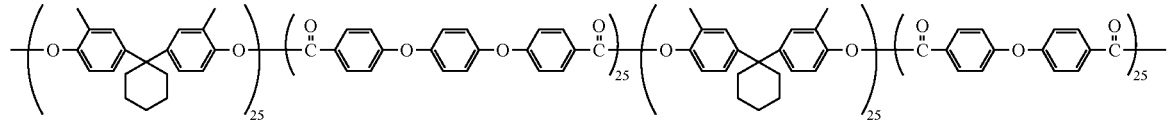

(Resin-4)

-continued
(Resin-5)
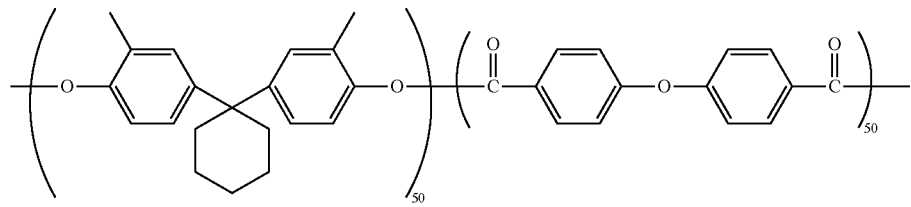
(Resin-6)
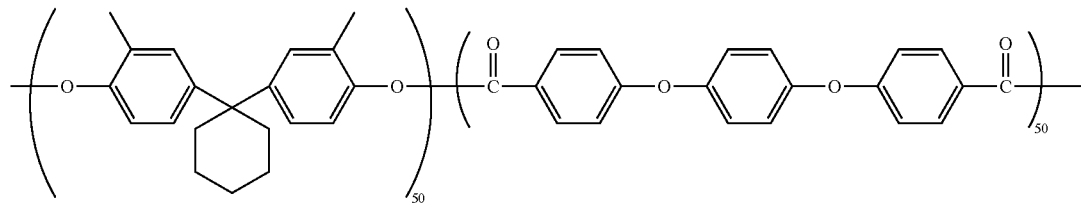
(Resin-7)
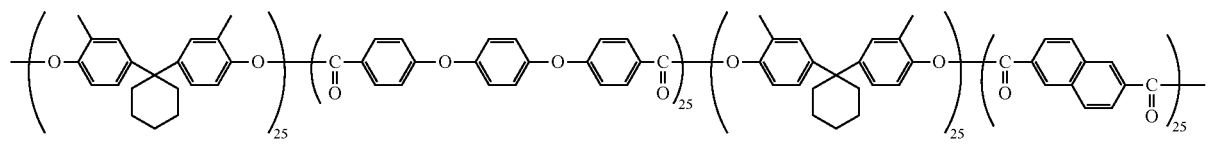
(Resin-8)
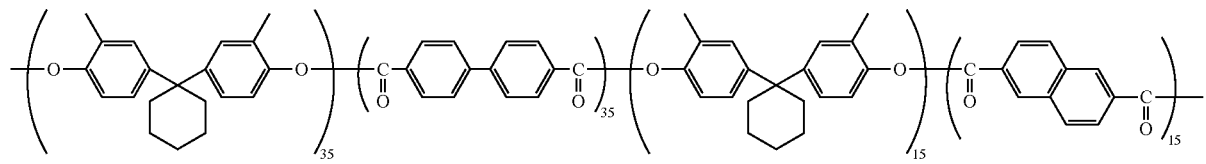
(Resin-9)
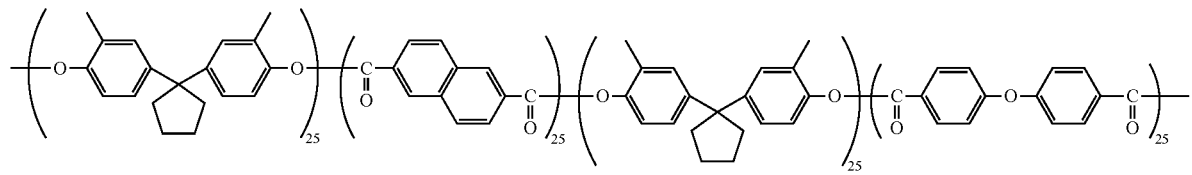
(Resin-10)
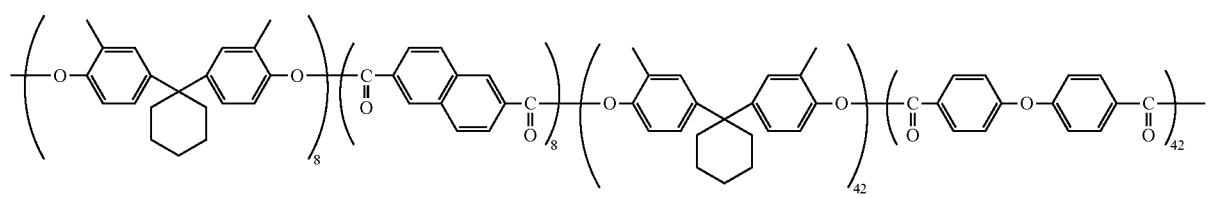
(Resin-11)
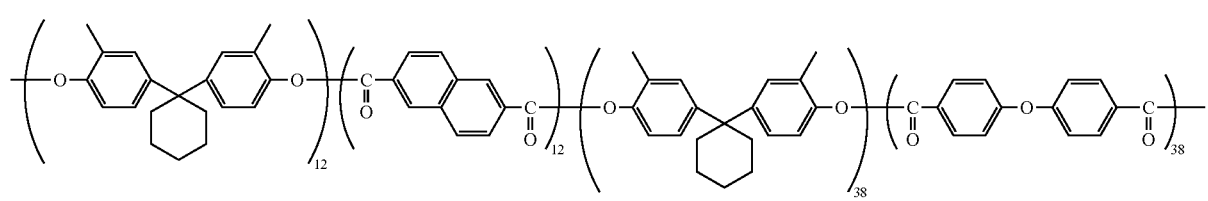
(Resin-12)
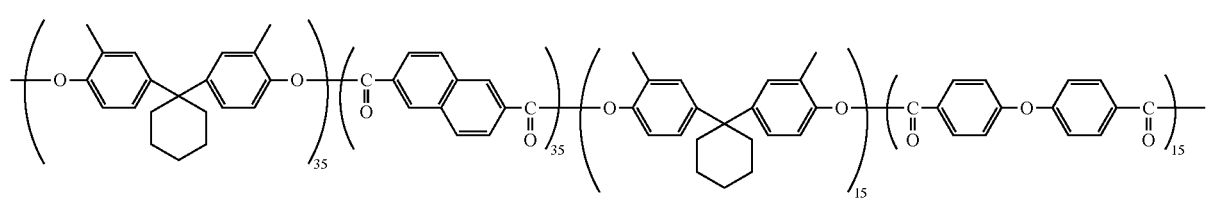

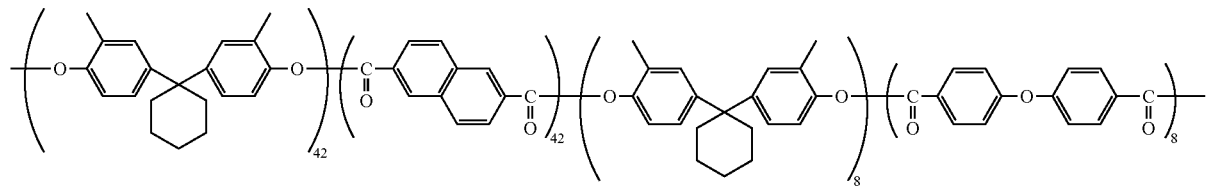

(Resin-13)

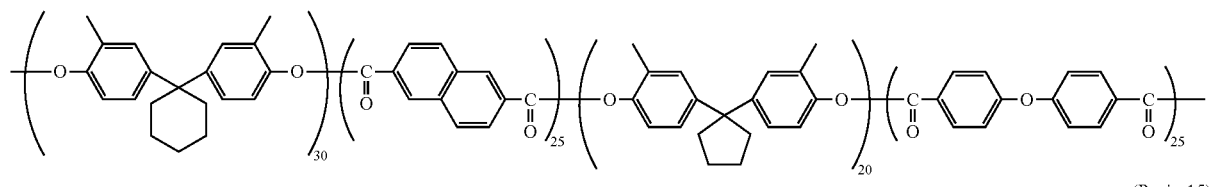

(Resin-14)

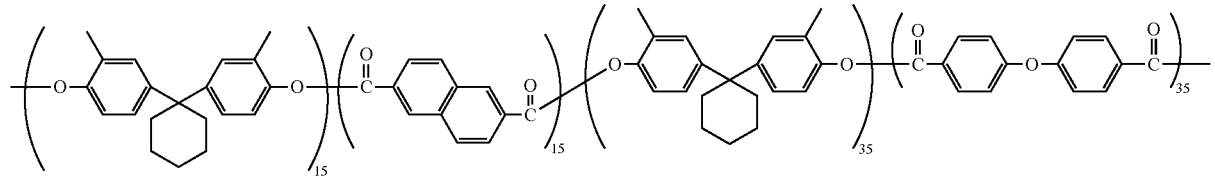

(Resin-15)

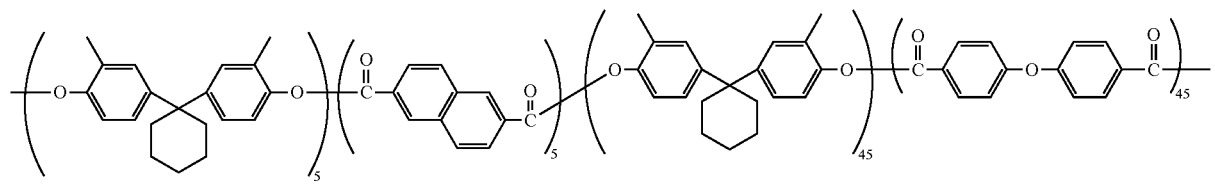

(Resin-16)

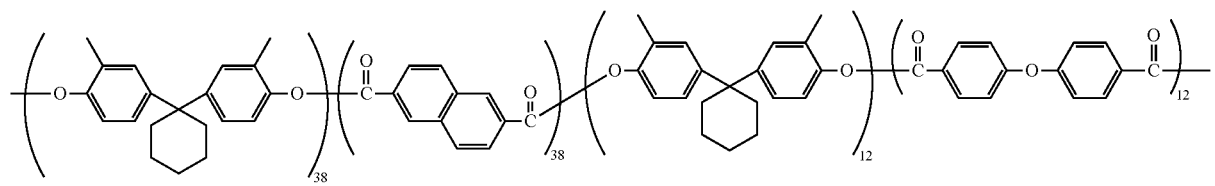

(Resin-17)

<Second Embodiment: Photosensitive Member>

An electrophotographic photosensitive member according to a second embodiment of the present disclosure (also referred to below as a photosensitive member) includes a photosensitive layer. Examples of the photosensitive member include a multi-layer electrophotographic photosensitive member (also referred to below as a multi-layer photosensitive member) and a single-layer electrophotographic photosensitive member (also referred to below as a single-layer photosensitive member).

Figure 1B:
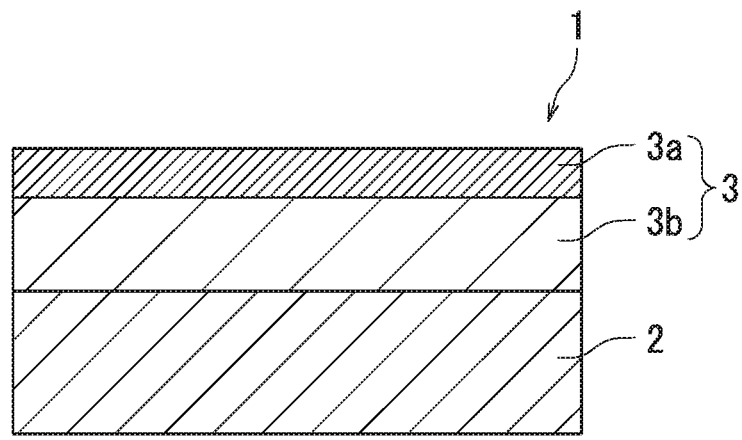
Figure 1C:
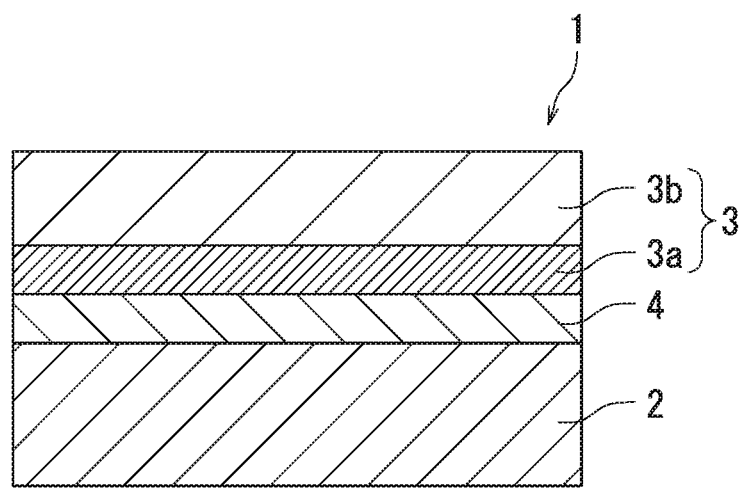
Figure 5:
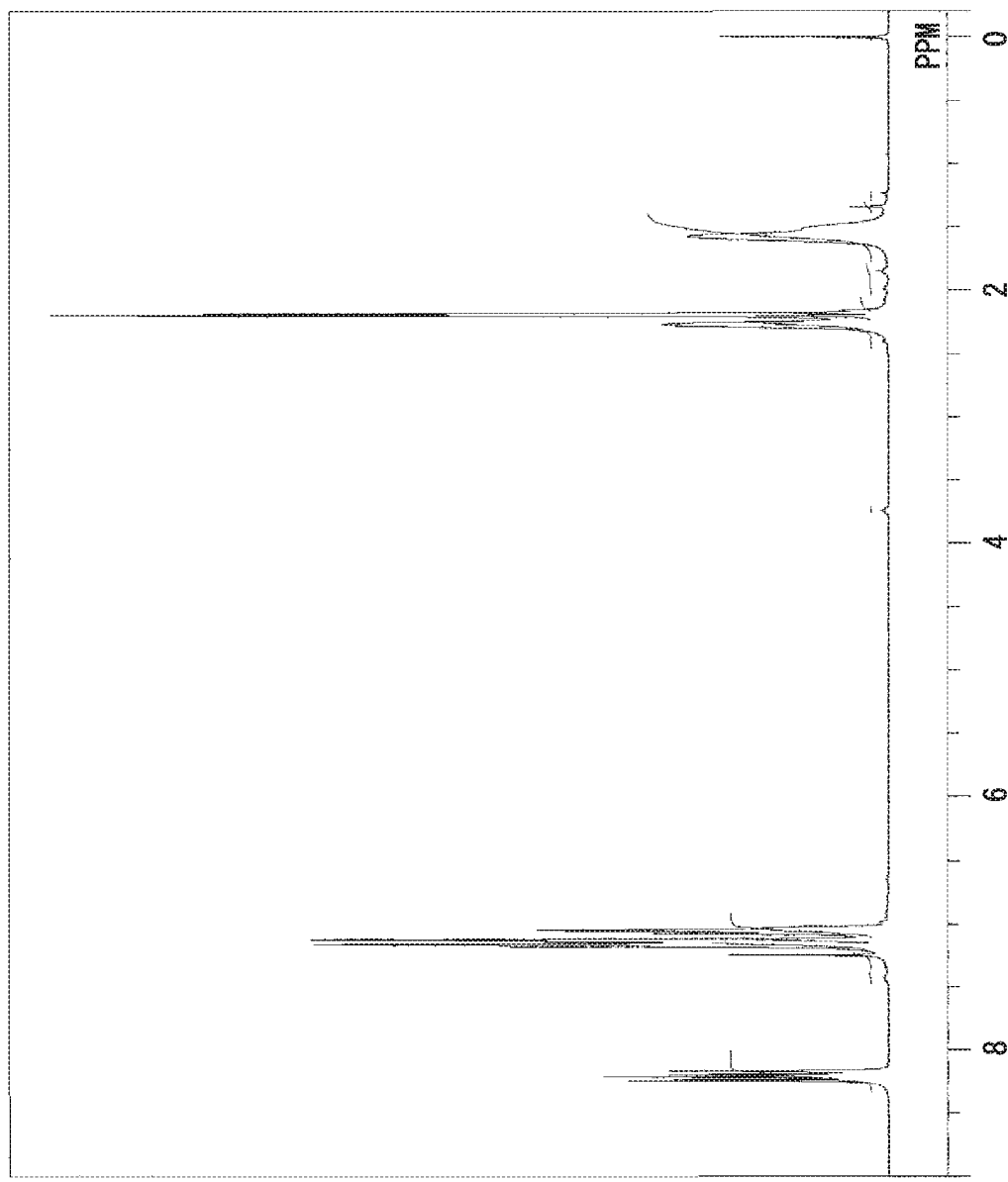
FIG. 5 is a ¹H-NMR spectrum of a polyarylate resin represented by chemical formula (Resin-4).

The multi-layer photosensitive member includes a charge generating layer and a charge transport layer. The following describes configuration of a multi-layer photosensitive member 1 according to the present embodiment with reference to FIGS. 1A-1C. FIG. 1 is a schematic cross-sectional view illustrating a configuration of the multi-layer photosensitive member 1. As illustrated in FIG. 1A, the photosensitive member 1 includes for example a conductive substrate 2 and a photosensitive layer 3. The photosensitive layer 3 includes a charge generating layer 3a and a charge transport layer 3b. As illustrated in FIG. 1A, the charge transport layer 3b may be disposed on the charge generating layer 3a disposed on the conductive substrate 2 in the multi-layer photosensitive member 1. Alternatively, as illustrated in FIG. 1B, the charge generating layer 3a may be disposed on the charge transport layer 3b disposed on the conductive substrate 2 in the multi-layer photosensitive member 1. As illustrated in FIG. 1A, the charge transport layer 3b may be disposed as a topmost layer of the multi-layer photosensitive member 1. The charge transport layer 3b may be a single layer.

As illustrated in FIG. 1A, the photosensitive layer 3 may be disposed directly on the conductive substrate 2. Alternatively, as illustrated in FIG. 1C, the multi-layer photosensitive member 1 further includes for example an intermediate layer 4 (underlying layer) in addition to the conductive substrate 2 and the photosensitive layer 3. The photosensitive layer 3 may be disposed indirectly on the conductive substrate 2, as illustrated in FIG. 1C. The intermediate layer 4 may be disposed between the conductive substrate 2 and the charge generating layer 3a, as illustrated in FIG. 1C. The intermediate layer 4 may be disposed for example between the charge generating layer 3a and the charge transport layer 3b. The charge generating layer may be a single layer or a multilayer.

The single-layer photosensitive member includes a single photosensitive layer. Similarly to the multi-layer photosensitive member, the single-layer photosensitive member includes for example a conductive substrate and a photosensitive layer. The single-layer photosensitive member may include an intermediate layer. The photosensitive layer may be disposed as a topmost layer of the single-layer photosensitive member.

The photosensitive member 1 in the present embodiment is excellent in abrasion resistance. The reason therefore is inferred as follows. The photosensitive member 1 in the present embodiment contains the polyarylate resin (1) as a binder resin. The polyarylate resin (1) has a cyclopentylidene group or a cyclohexylidene group. Further, the mole fraction r/(r+t) of the repeating units derived from the respective aromatic diols is at least 0.00 and no greater than 0.90. The mole fraction s/(s+u) of the repeating units derived from the respective aromatic dicarboxylic acids is at least 0.00 and no greater than 0.90. In the polyarylate resin (1) having the above configuration, entanglement of molecular chains and packability of molecules can be hardly impaired. The polyarylate resin (1) having the above configuration has high solubility in a solvent, and therefore, an application liquid for photosensitive layer formation can be easily prepared. As a result, a photosensitive layer having high layer density can be obtained. The photosensitive member 1 of the present embodiment is accordingly excellent in abrasion resistance.

The following describes elements (the conductive substrate, the photosensitive layer, and the intermediate layer) of the photosensitive member according to the present embodiment. A photosensitive member production method will be also described.

[1. Conductive Substrate]

No particular limitations are placed on the conductive substrate other than being adoptable as a conductive substrate of a photosensitive member. At least a surface portion of the conductive substrate is made from a material having conductivity (also referred to below as a conductive material). Examples of the conductive substrate include a conductive substrate made from a conductive material and a substrate covered with a conducive material. Examples of the conductive material include aluminum, iron, copper, tin, platinum, silver, vanadium, molybdenum, chromium, cadmium, titanium, nickel, palladium, and indium. One of the conductive materials listed above may be used or two or more of the conductive materials listed above may be used in combination. Examples of the combination of two or more of the conductive materials listed above include alloys (specific examples include an aluminum alloy, stainless steel, and brass).

Among the conductive materials listed above, aluminum or an aluminum alloy is preferable in terms of excellent mobility of electrical charges from the photosensitive layer to the conductive substrate.

Shape of the conductive substrate can be appropriately selected according to a configuration of an image forming apparatus to which the conductive substrate is adopted. Examples of the shape of the conductive substrate include a sheet-like shape and a drum-like shape. Thickness of the conductive substrate is also appropriately selected according to the shape of the conductive substrate.

[2. Photosensitive Layer]

The photosensitive layer contains a charge generating material, a hole transport material, and a binder resin. The binder resin contains the polyarylate resin (1). The photosensitive layer may optionally contain an additive. The photosensitive layer of the multi-layer photosensitive member includes the charge generating layer and the charge transport layer. The charge generating layer contains the charge generating material. The charge transport layer contains the hole transport material and the binder resin. No particular limitations are placed on the thickness of the charge generating layer as long as it can satisfactorily work as a charge generating layer. Specifically, the charge generating layer preferably has a thickness of at least 0.01 µm and no greater than 5 µm with at least 0.1 µm and no greater than 3 µm being more preferable. No particular limitations are placed on the thickness of the charge transport layer as long as it can satisfactorily work as a charge transport layer. Specifically, the charge transport layer preferably has a thickness of at least 2 µm and no greater than 100 µm with at least 5 µm and no greater than 50 µm being more preferable.

The photosensitive layer (single-layer photosensitive layer) of the single-layer photosensitive member contains the charge generating material, the hole transport material, and the binder resin. No particular limitations are placed on the thickness of the photosensitive layer as long as the thickness thereof is sufficient to enable the layer to implement a function thereof. Specifically, the photosensitive layer may have a thickness of at least 5 µm and no greater than 100 µm with at least 10 µm and no greater than 50 µm being preferable.

[2-1. Common Elements of Constitution]

The following describes the charge generating material, the hole transport material, and the binder resin. An additive will be described also.

[2-1-1. Charge Generating Material]

No particular limitations are placed on the charge generating material other than being a charge generating material for a photosensitive member. Examples of the charge generating material include phthalocyanine-based pigments, perylene-based pigments, bisazo pigments, dithioketopyrrolopyrrole pigments, metal-free naphthalocyanine pigments, metal naphthalocyanine pigments, squaraine pigments, trisazo pigments, indigo pigments, azulenium pigments, cyanine pigments, pyrylium salts, anthanthrone-based pigments, triphenylmethane-based pigments, threne-based pigments, toluidine-based pigments, pyrazoline-based pigments, quinacridon-based pigments, and powders of inorganic photoconductive materials such as selenium, selenium-tellurium, selenium-arsenic, cadmium sulfide, and amorphous silicon. Examples of phthalocyanine-based pigments include phthalocyanine pigments and pigments of phthalocyanine derivatives. Examples of phthalocyanine pigments include metal-free phthalocyanine pigments (a specific example is an X-form metal-free phthalocyanine (x-$H_2$Pc) pigment). Examples of pigments of phthalocyanine derivatives include metal phthalocyanines pigments (specific examples include a titanyl phthalocyanine pigment and a V-form hydroxygallium phthalocyanine pigment). No particular limitations are placed on crystal structure of the phthalocyanine-based pigments, and a phthalocyanine-based pigment having any crystal structure is usable. Examples of the crystal structure of a phthalocyanine-based pigment include α-form, β-form, and Y-form. One of the charge generating materials listed above may be used or two or more of the charge generating materials listed above may be used in combination.

One or a combination of two or more of charge generating materials having an absorption wavelength in a desired region may be used. For example, a photosensitive member having sensitivity in a wavelength range of at least 700 nm is preferably used in a digital optical image forming apparatus. Examples of the digital optical image forming apparatus include a laser beam printer and a facsimile machine each with a light source such as a semiconductor laser. For the reason as above, for example, a phthalocyanine-based pigment is preferable with Y-form titanyl phthalocyanine (Y-TiOPc) being more preferable. Note that Y-form titanyl phthalocyanine may have one peak at a Bragg angle $2\theta \pm 0.2° = 27.2°$ in a Cu-Kα characteristic X-ray diffraction spectrum.

An anthanthrone-based pigment or a perylene-based pigment is suitably used as a charge generating material of a photosensitive member adopted in an image forming apparatus with a short-wavelength laser light source. The short-wavelength laser light source has for example a wavelength between approximately 350 nm and approximately 550 nm.

The charge generating material is for example a phthalocyanine-based pigment represented by any of chemical formulas (CGM-1)-(CGM-4) (also referred to below as charge generating materials (CGM-1)-(CGM-4), respectively).

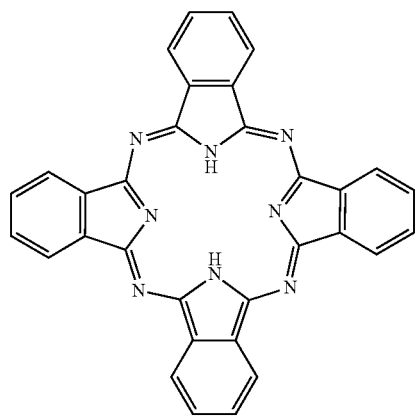

(CGM-1)

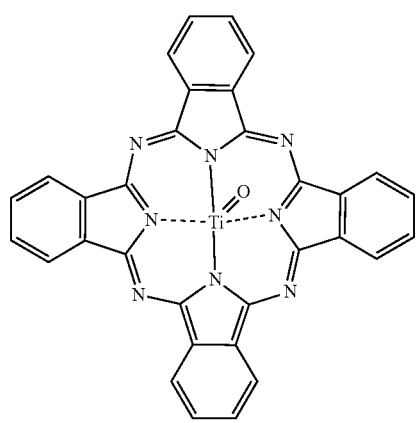

(CGM-2)

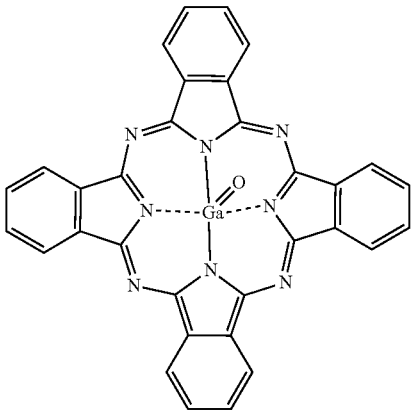

(CGM-3)

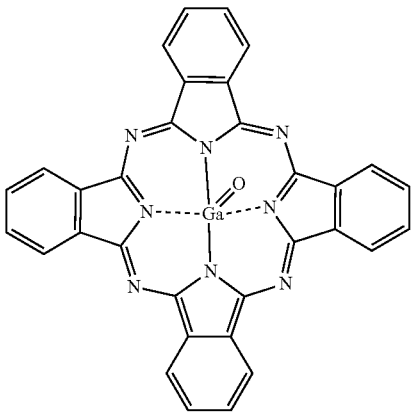

(CGM-4)

The content of the charge generating material is preferably at least 5 parts by mass and no greater than 1,000 parts by mass relative to 100 parts by mass of a charge generating layer binder resin (also referred to below as a base resin), and more preferably at least 30 parts by mass and no greater than 500 parts by mass.

[2-1-2. Hole Transport Material]

Examples of the hole transport material include: triarylamine derivatives; diamine derivatives (specific examples include an N,N,N',N'-tetraphenylphenylenediamine derivative, an N,N,N',N'-tetraphenylnaphtylenediamine derivative, and an N,N,N',N'-tetraphenylphenanthrylenediamine derivative); oxadiazole-based compounds (a specific example is 2,5-di(4-methylaminophenyl)-1,3,4-oxadiazole); styryl-based compounds (a specific example is 9-(4-diethylaminostyryl)anthracene); carbazole-based compounds (a specific example is polyvinyl carbazole); organic polysilane compounds; pyrazoline-based compounds (a specific example is 1-phenyl-3-(p-dimethylaminophenyl)pyrazoline); hydrazone-based compounds; indole-based compounds; oxazole-based compounds; isoxazole-based compounds; thiazole-based compounds; thiadiazole-based compounds; imidazole-based compounds; pyrazole-based compounds; and triazole-based compounds. Among the hole transport materials listed above, any of compounds represented by respective general formulas (2), (3), and (4) is preferable. The hole transport material preferably contains a compound represented by any of the general formulas (2)-(4) in terms of improving abrasion resistance of the photosensitive member. The hole transport material preferably contains the compound represented by respective general formula (2) or (3) in terms of improving electrical characteristics in addition to abrasion resistance of the photosensitive member. The hole transport material further preferably contains the compound represented by the general formula (3).

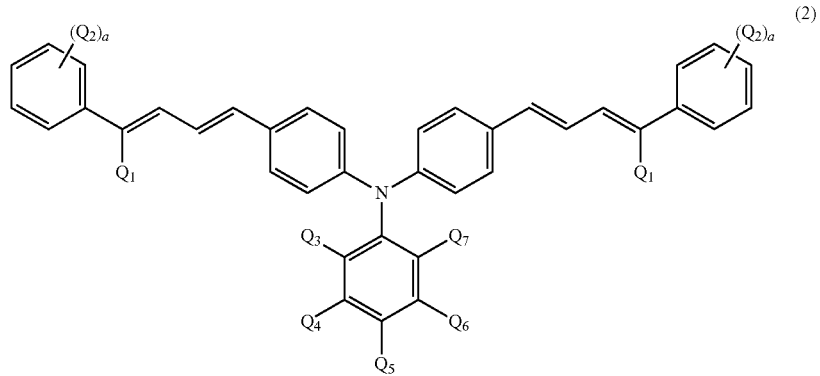

(2)

In general formula (2), $Q_1$ represents a hydrogen atom, an alkyl group having 1 to 8 carbon atoms, an alkoxy group having 1 to 8 carbon atoms, or a phenyl group optionally substituted with an alkyl group having 1 to 8 carbon atoms. Chemical groups $Q_2$ each represent, independently of one another, an alkyl group having 1 to 8 carbon atoms, an alkoxy group having 1 to 8 carbon atoms, or a phenyl group. $Q_3$, $Q_4$, $Q_5$, $Q_6$, and $Q_7$ each represent, independently of one another, a hydrogen atom, an alkyl group having 1 to 8 carbon atoms, an alkoxy group having 1 to 8 carbon atoms, or a phenyl group. Adjacent two of $Q_3$, $Q_4$, $Q_5$, $Q_6$, and $Q_7$ may be bonded together to form a ring. Further, a represents an integer of at least 0 and no greater than 5. In a configuration in which a represents an integer of at least 2 and no greater than 5, chemical groups $Q_2$ bonded to the same phenyl group may be the same or different from one another.

In general formula (3), $Q_8$, $Q_{10}$, $Q_{11}$, $Q_{12}$, $Q_{13}$, and $Q_{14}$ each represent, independently of one another, a hydrogen atom, an alkyl group having 1 to 8 carbon atoms, an alkoxy group having 1 to 8 carbon atoms, or a phenyl group. $Q_9$ and $Q_{15}$ each represent, independently of one another, an alkyl group having 1 to 8 carbon atoms, an alkoxy group having 1 to 8 carbon atoms, or a phenyl group. Further, b represents an integer of at least 0 and no greater than 5. In a configuration in which b represents an integer of at least 2 and no greater than 5, chemical groups $Q_9$ bonded to the same phenyl group may be the same or different from each other. Further, c represents an integer of at least 0 and no greater than 4. In a configuration in which c represents an integer of at least 2 and no greater than 4, chemical groups $Q_{15}$ bonded to the same phenylene group may be the same of different from each other. Furthermore, k represents 0 or 1.

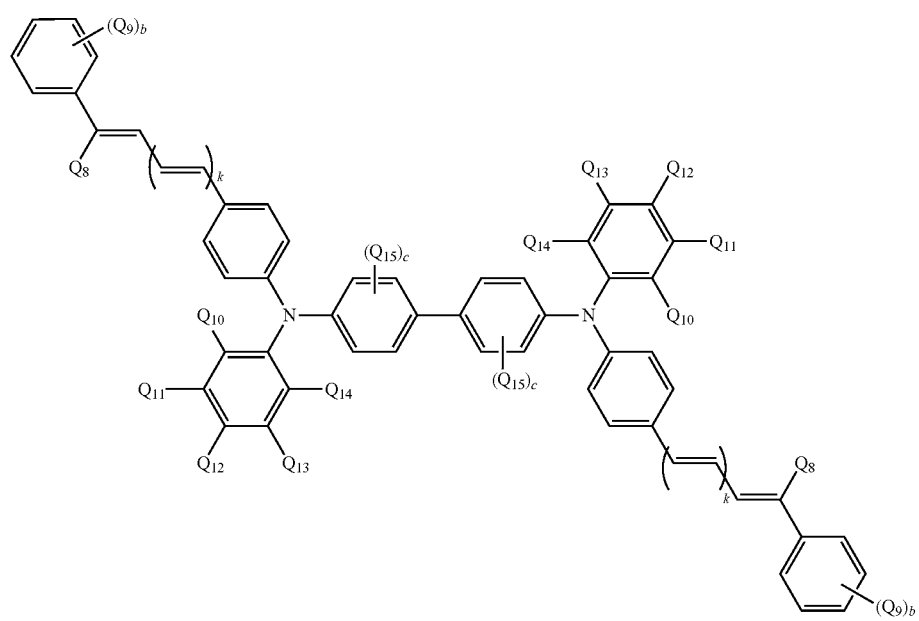

(3)

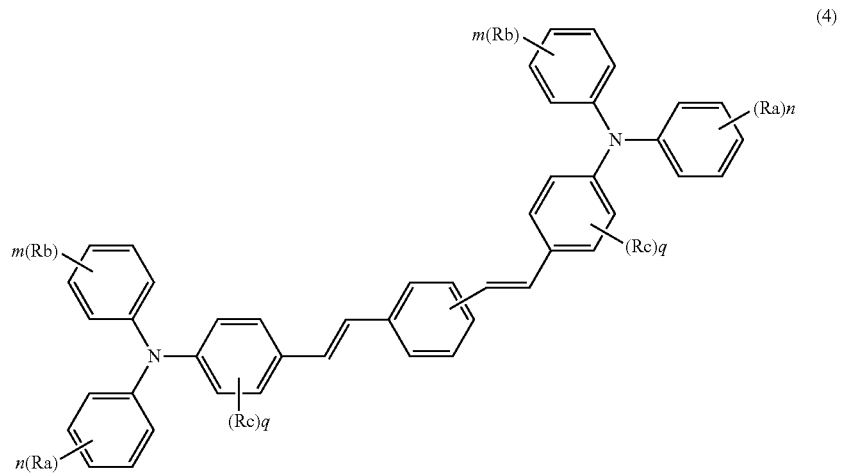

(4)

In general formula (4), $R_a$, $R_b$, and $R_c$ each represent, independently of one another, an alkyl group having 1 to 8 carbon atoms, a phenyl group, or an alkoxy group having 1 to 8 carbon atoms. Further, q represents an integer of at least 0 and no greater than 4. In a configuration in which q represents an integer of at least 2 and no greater than 4, chemical groups $R_c$ bonded to the same phenyl group may be the same or different from each other. Further, m and n each represent, independently of one another, an integer of at least 0 and no greater than 5. In a configuration in which m represents an integer of at least 2 and no greater than 5, chemical groups $R_b$ bonded to the same phenylene group may be the same or different from each other. In a configuration in which n represents an integer of at least 2 and no greater than 5, chemical groups $R_a$ bonded to the same phenyl group may be the same or different from each other.

In general formula (2), the phenyl group represented by $Q_1$ is preferably a phenyl group substituted with an alkyl group having 1 to 8 carbon atoms, and more preferably a phenyl group substituted with a methyl group.

In general formula (2), the alkyl group having 1 to 8 carbon atoms represented by $Q_2$ is preferably an alkyl group having 1 to 6 carbon atoms, more preferably an alkyl group having 1 to 4 carbon atoms, and further preferably a methyl group. Furthermore, a preferably represents 0 or 1.

In general formula (2), the alkyl group having 1 to 8 carbon atoms represented by any of $Q_3$-$Q_7$ is preferably an alkyl group having 1 to 4 carbon atoms, and more preferably an n-butyl group. In general formula (2), the alkoxy group having 1 to 8 carbon atoms represented by any of $Q_3$-$Q_7$ is preferably an alkoxy group having 1 to 4 carbon atoms, and more preferably a methoxy group or an ethoxy group. In general formula (2), preferably, $Q_3$-$Q_7$ each represent, independently of one another, a hydrogen atom, an alkyl group having 1 to 8 carbon atoms, or an alkoxy group having 1 to 8 carbon atoms, and more preferably a hydrogen atom, an alkyl group having 1 to 4 carbon atoms, or an alkoxy group having 1 to 4 carbon atoms.

In general formula (2), adjacent two of $Q_3$-$Q_7$ may bond together to form a ring (specific examples include a benzene ring and a cycloalkane having 5 to 7 carbon atoms). For example, adjacent $Q_6$ and $Q_7$ among $Q_3$-$Q_7$ may bond together to form a benzene ring or a cycloalkane having 5 to 7 carbon atoms. In a configuration in which adjacent two of $Q_3$-$Q_7$ bond together to form a benzene ring, the benzene ring is condensed with a phenyl group to which any of $Q_3$-$Q_7$ is bonded, thereby forming a fused bi-cyclic group (naphthyl group). In a configuration in which adjacent two of $Q_3$-$Q_7$ bond together to form a cycloalkane having 5 to 7 carbon atoms, the cycloalkane having 5 to 7 carbon atoms is condensed with a phenyl group to which any of $Q_3$-$Q_7$ is bonded, thereby forming a fused bi-cyclic group. In the above configuration, a condensation portion between the cycloalkane having 5 to 7 carbon atoms and the phenyl group may have a double bond. Preferably, adjacent two of $Q_3$-$Q_7$ bond together to form a cycloalkane having 5 to 7 carbon atoms, and more preferably cyclohexane.

In general formula (2), $Q_1$ preferably represents a hydrogen atom or a phenyl group substituted with an alkyl group having 1 to 8 carbon atoms. $Q_2$ preferably represents an alkyl group having 1 to 8 carbon atoms. Preferably, $Q_3$-$Q_7$ each represent, independently of one another, a hydrogen atom, an alkyl group having 1 to 8 carbon atoms, or an alkoxy group having 1 to 8 carbon atoms. Preferably, adjacent two of $Q_3$-$Q_7$ bond together to form a ring. Further, a preferably represents 0 or 1.

In general formula (3), the alkyl group having 1 to 8 carbon atoms represented by any of $Q_8$ and $Q_{10}$-$Q_{14}$ is preferably an alkyl group having 1 to 4 carbon atoms, and more preferably a methyl group or an ethyl group. In general formula (3), preferably, $Q_8$ and $Q_{10}$-$Q_{14}$ each represent, independently of one another, a hydrogen atom, an alkyl group having 1 to 4 carbon atoms, or a phenyl group. In general formula (3), preferably, b and c each represent 0.

In general formula (4), the alkyl group having 1 to 8 carbon atoms represented by $R_a$ or $R_b$ is preferably an alkyl group having 1 to 4 carbon atoms, and more preferably a methyl group or an ethyl group. Preferably, m and n each represent, independently of one another, an integer of at least 0 and no greater than 2. Preferably, q represents 0.

Specific examples of the hole transport material include hole transport materials represented by formulas (HTM-1)-(HTM-9) (also referred to below as hole transport materials (HTM-1)-(HTM-9), respectively). Note that the hole transport materials (HTM-1)-(HTM-4) are specific examples of the compound represented by general formula (2). The hole transport materials (HTM-5)-(HTM-7) are specific examples of the compound represented by general formula (3). The hole transport materials (HTM-8) and (HTM-9) are specific examples of the compound represented by general formula (4).

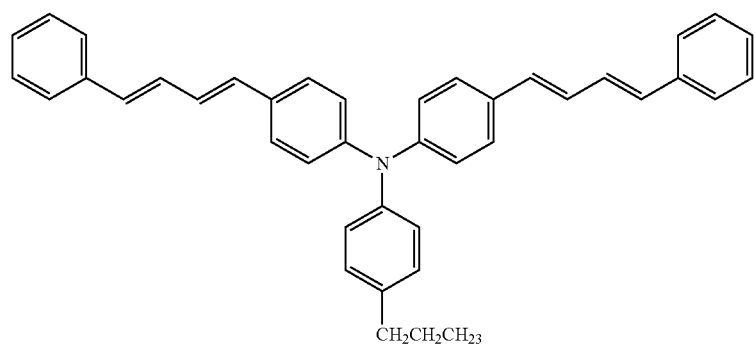
(HTM-1)
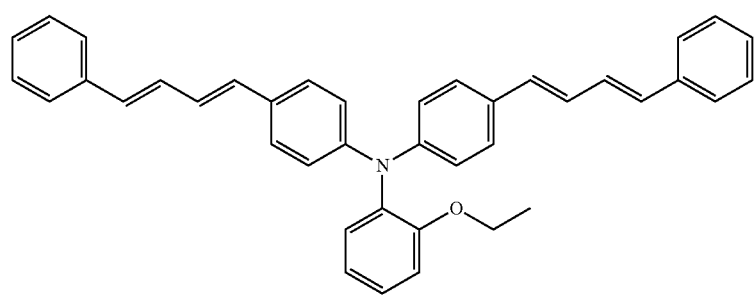
(HTM-2)
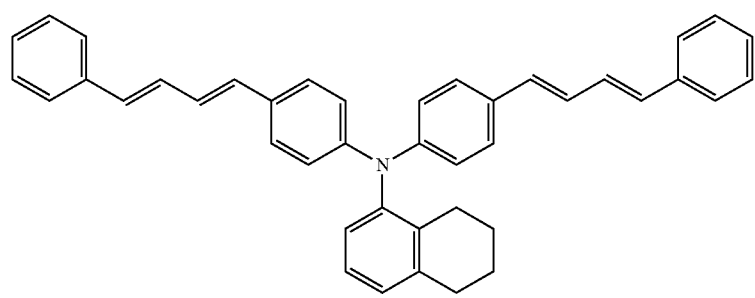
(HTM-3)
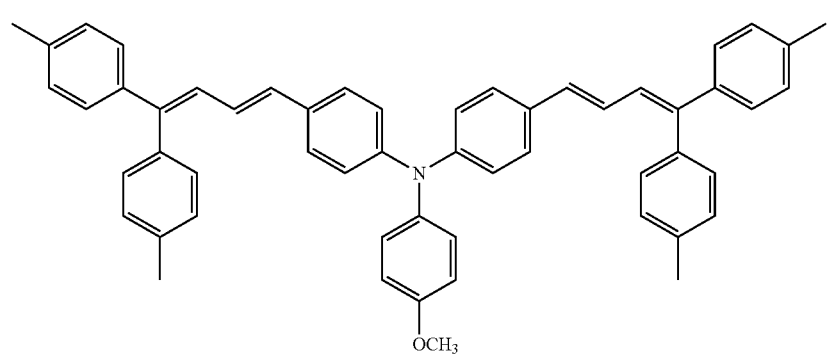
(HTM-4)

(HTM-5)
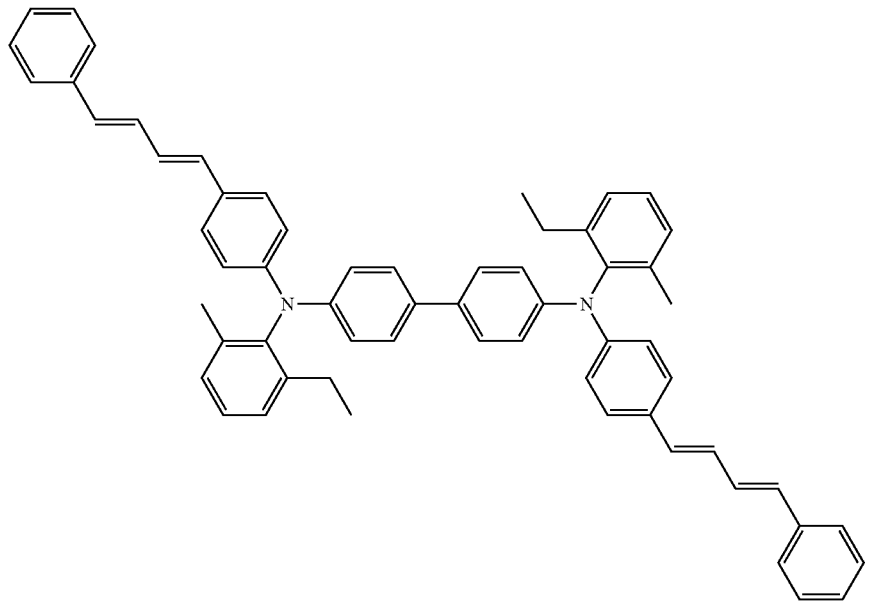
(HTM-6)
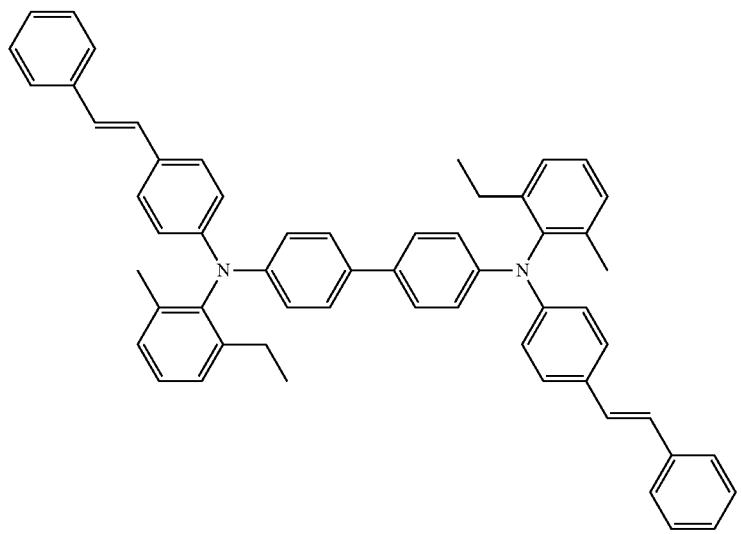
(HTM-7)
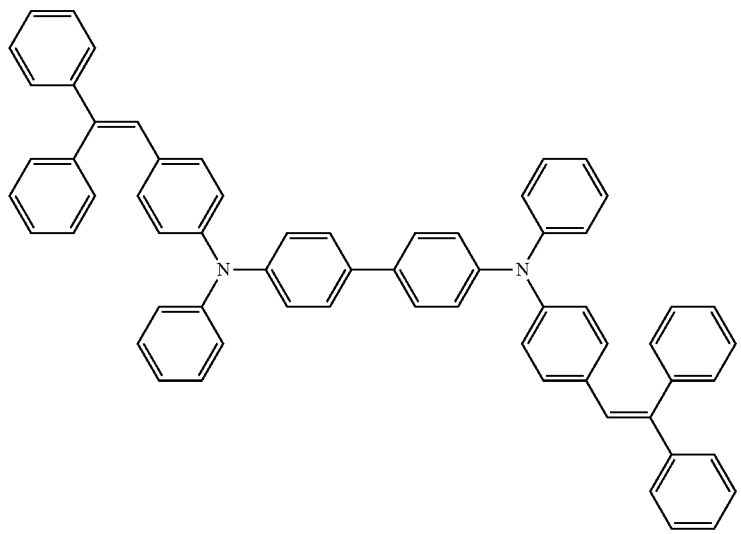

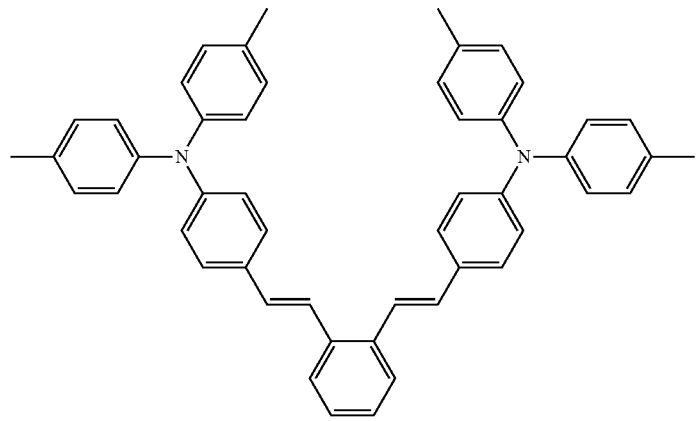
(HTM-8)

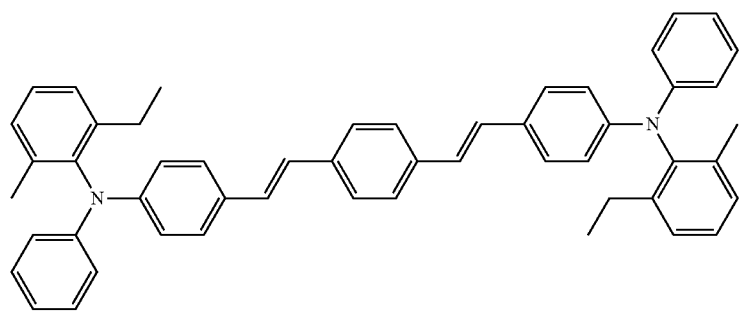
(HTM-9)

The content of the hole transport material in the multi-layer photosensitive member is preferably at least 10 parts by mass and no greater than 200 parts by mass relative to 100 parts by mass of the binder resin, and more preferably at least 20 parts by mass and no greater than 100 parts by mass.

[2-1-3. Binder Resin]

The binder resin is contained in the charge transport layer of the multi-layer photosensitive member or the photosensitive layer of the single-layer photosensitive member. The binder resin contains the polyarylate resin (1). Containment of the polyarylate resin (1) in the photosensitive member can improve abrasion resistance of the photosensitive member.

The binder resin in the present embodiment may contain the polyarylate resin (1) alone. Alternatively, a resin other than the polyarylate resin (1) may be optionally contained in the binder resin as long as the advantages of the present disclosure are still achieved. Examples of the resin other than the polyarylate resin (1) include thermoplastic resins (specific examples include a polyarylate resin other than the polyarylate resin (1), a polycarbonate resin, a styrene-based resin, a styrene-butadiene copolymer, a styrene-acrylonitrile copolymer, a styrene-maleate copolymer, a styrene-acrylate copolymer, an acrylic copolymer, a polyethylene resin, an ethylene-vinyl acetate copolymer, a chlorinated polyethylene resin, a polyvinyl chloride resin, a polypropylene resin, ionomer, a vinyl chloride-vinyl acetate copolymer, a polyester resin, an alkyd resin, a polyamide resin, a polyurethane resin, a polysulfone resin, a diallyl phthalate resin, a ketone resin, a polyvinyl butyral resin, a polyether resin, and a polyester resin), thermosetting resins (specific examples include a silicone resin, an epoxy resin, a phenolic resin, a urea resin, a melamine resin, and other crosslinkable thermosetting resins), and photocurable resins (specific examples include an epoxy-acrylic acid-based resin and a urethane-acrylic acid-based copolymer). One of the resins listed above may be used or two or more of the resins listed above may be used in combination. The content of the polyarylate resin (1) is preferably at least 80 parts by mass relative to 100 parts by mass of the binder resin, more preferably at least 90 parts by mass, and further preferably 100 parts by mass.

A content ratio of the binder resin is preferably 40% by mass relative to a total mass of all elements of constitution contained in the charge transport layer (for example, the hole transport material and the binder resin), and more preferably 80% by mass.

[2-1-4. Additive]

At least one of the charge generating layer, the charge transport layer, the photosensitive layer of the single-layer photosensitive member, and the intermediate layer may contain one or more additives within a range not adversely affecting the electrophotographic characteristics. Examples of the additives include antidegradants (specific examples include an antioxidant, a radical scavenger, a quencher, and a ultraviolet absorbing agent), softeners, surface modifiers, extenders, thickeners, dispersion stabilizers, waxes, electron acceptor compounds, donors, surfactants, and leveling agents.

Examples of the antioxidants include hindered phenol compounds, hindered amine compounds, thioether compounds, and phosphite compounds. A hindered phenol compound or a hindered amine compound is preferable among the antioxidants listed above.

An example of the softeners is meta-terphenyl.

The additive amount of an antioxidant in the charge transport layer is preferably at least 0.1 parts by mass and no greater than 10 parts by mass relative to 100 parts by mass of the binder resin. In a configuration in which the additive amount of the antioxidant is within the range as above, degradation of electrical characteristics caused due to oxidation of the photosensitive member tends to be inhibited.

[2-2. Non-Common Elements of Constitution]

The charge generating layer of the multi-layer photosensitive member may optionally contain a charge generating layer binder resin (also referred to below as a base resin). No limitations are placed on the base resin other than being adoptable to a photosensitive member. Examples of the base resin include thermoplastic resins, thermosetting resins, and photocurable resins. Examples of thermoplastic resin include a styrene-based resin, a styrene-butadiene copolymer, a styrene-acrylonitrile copolymer, a styrene-maleic acid copolymer, a styrene-acrylic acid-based copolymer, an acrylic copolymer, a polyethylene resin, an ethylene-vinyl acetate copolymer, a chlorinated polyethylene resin, a polyvinyl chloride resin, a polypropylene resin, ionomer, a vinyl chloride-vinyl acetate copolymer, an alkyd resin, a polyamide resin, a urethane resin, a polycarbonate resin, a polyarylate resin, a polysulfone resin, a diallyl phthalate resin, a ketone resin, a polyvinyl butyral resin, a polyether resin, and a polyester resin. Examples of thermosetting resin include a silicone resin, an epoxy resin, a phenolic resin, a urea resin, a melamine resin, and other crosslinkable thermosetting resins. Examples of photocurable resin include an epoxy acrylic acid-based resin and a urethane-acrylic acid-based resin. One of the resins listed above may be used or two or more of the resins listed above may be used in combination.

The same resins as those listed as the examples of the binder resin are included in the examples of the base resin. However, a resin different from the binder resin is usually selected as the base resin in the same multi-layer photosensitive member. The reason therefor is as follows. In a situation in which a multi-layer photosensitive member is produced, typically, a charge generating layer is formed first and a charge transport layer is then formed. An application liquid for charge transport layer formation is accordingly applied onto the charge generating layer. It is preferable that the charge generating layer does not dissolve in a solvent of the application liquid for charge transport layer formation during formation of the charge transport layer. In view of the foregoing, a resin different from the binder resin is usually selected as the base resin in the same multi-layer photosensitive member.

[3. Intermediate Layer]

The photosensitive member of the present embodiment may include an intermediate layer (for example, an undercoat layer). The intermediate layer contains for example inorganic particles and a resin (intermediate layer resin). In the presence of the intermediate layer, electric current generated in exposure of the photosensitive member can smoothly flow while an insulation state to an extent that occurrence of leakage current can be inhibited is maintained, thereby suppressing an increase in electric resistance.

Examples of the inorganic particles include particles of metals (specific examples include aluminum, iron, and copper), particles of metal oxides (specific examples include titanium oxide, alumina, zirconium oxide, tin oxide, and zinc oxide), and particles of non-metal oxides (a specific example is silica). One type of the organic particles listed above may be used or two or more types of the inorganic particles listed above may be used in combination.

No particular limitations are placed on the intermediate layer resin other than being usable as a resin for intermediate layer formation.

[4. Photosensitive Member Production Method]

The following describes a photosensitive member production method. The photosensitive member production method includes for example a photosensitive layer formation step.

[4-1. Multi-Layer Photosensitive Member Production Method]

The photosensitive layer formation step in a multi-layer photosensitive member production method includes a charge generating layer formation step and a charge transport layer formation step. In the charge generating layer formation step, an application liquid for forming a charge generating layer (also referred to below as an application liquid for charge generating layer formation) is prepared first. The application liquid for charge generating layer formation is applied onto a conductive substrate to form an applied film. At least a part of a solvent contained in the application liquid for charge generating layer formation is then removed by drying the application liquid according to an appropriate method to form a charge generating layer. The application liquid for charge generating layer formation contains for example a charge generating material, a base resin, and the solvent. The application liquid for charge generating layer formation as above is prepared by dissolving or dispersing the charge generating material and the base resin in the solvent. One or more additives may be added to the application liquid for charge generating layer formation as needed.

In the charge transport layer formation step, an application liquid for forming a charge transport layer (also referred to below as an application liquid for charge transport layer formation) is prepared first. The application liquid for charge transport layer formation is applied onto the charge generating layer to form an applied film. At least a part of a solvent contained in the application liquid for charge transport layer formation is then removed by drying the application liquid according to an appropriate method to form a charge transport layer. The application liquid for charge transport layer formation contains a hole transport material, the polyarylate resin (1) as a binder resin and the solvent. The application liquid for charge transport layer formation can be prepared by dissolving or dispersing the hole transport material and the polyarylate resin (1) in the solvent. One or more additives may be added to the application liquid for charge transport layer formation as needed.

[4-2. Single-Layer Photosensitive Member Production Method]

In the photosensitive layer formation step in a single-layer photosensitive member production method, an application liquid for forming a photosensitive layer (also referred to below as an application liquid for photosensitive layer formation) is prepared. The application liquid for photosensitive layer formation is applied onto a conductive substrate to form an applied film. At least a part of a solvent contained in the application liquid for photosensitive layer formation is then removed by drying the application liquid according to an appropriate method to form a photosensitive layer. The application liquid for photosensitive layer formation contains for example a charge generating material, a hole transport material, the polyarylate resin (1) as a binder resin, and the solvent. The application liquid for photosensitive layer formation as above is prepared by dissolving or dispersing the charge generating material, the hole transport material, and the binder resin in the solvent. One or more additives may be added to the application liquid for photosensitive layer formation as needed.

The photosensitive layer formation step will be described further in detail. No particular limitations are placed on the respective solvents contained in the application liquid for charge generating layer formation, the application liquid for charge transport layer formation, and the application liquid for photosensitive layer formation (also referred collectively to below as application liquids) other than that the components contained in the respective application liquids can dissolve or disperse therein. Examples of the solvents include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include dichloromethane, dichloroethane, carbon tetrachloride, and chlorobenzene), ethers (specific examples include dimethyl ether, diethyl ether, tetrahydrofuran, ethylene glycol dimethyl ether, and diethylene glycol dimethyl ether), ketones (specific examples include acetone, methyl ethyl ketone, and cyclohexanone), esters (specific examples include ethyl acetate and methyl acetate), dimethyl formaldehyde, dimethyl formamide, and dimethyl sulfoxide. One of the solvents listed above may be used or two or more of the solvents listed above may be used in combination. A non-halogenated solvent is preferable among the solvents listed above.

It is further preferable that the solvent contained in the application liquid for charge transport layer formation is different from the solvent contained in the application liquid for charge generating layer formation. In a situation in which a multi-layer photosensitive member is produced, typically, the charge generating layer is formed first and the charge transport layer is then formed. The application liquid for charge transport layer formation is accordingly applied onto the charge generating layer. As such, the charge generating layer is required not to dissolve in the solvent of the application liquid for charge transport layer formation during formation of the charge transport layer.

The application liquid for charge generating layer formation, the application liquid for charge transport layer formation, and the application liquid for photosensitive layer formation each are prepared by mixing the respective components and dispersing the components in the respective solvents. The respective components can be mixed or dispersed using a bead mill, a roll mill, a ball mill, an attritor, a paint shaker, or a ultrasonic disperser.

The application liquids may each contain for example a surfactant or a leveling agent in order to improve dispersibility of the respective components or surface smoothness of the respective layers to be formed.

No particular limitations are placed on methods for applying the respective application liquids as long as uniform application of the respective application liquids can be achieved. Examples of the application methods include dip coating, spray coating, spin coating, and bar coating.

No particular limitations are placed on methods for removing at least a part of the solvents contained in the respective application liquids as long as at least a part of the solvents in the respective application liquids can be evaporated. Examples of the removal methods include heat application, pressure application, and combinational application of heat and pressure. A more specific example is a heat treatment (hot-air drying) using a high-temperature dryer or a reduced pressure dryer. Conditions of the heat treatment include for example a temperature of at least 40° C. and no greater than 150° C. and a time period of at least three minutes and no greater than 120 minutes.

Note that the photosensitive member production method may additionally include an intermediate layer formation step as needed. An appropriate known method can be selected for the intermediate layer formation step.

The electrophotographic photosensitive member in the present disclosure described above, which is excellent in abrasion resistance, can be favorably used in various types of image forming apparatuses.

EXAMPLES

The following provides more specific explanation of the present disclosure through examples. Note that the present disclosure is not in any way limited by the following examples.

<<Preparation of Polyarylate Resin>>
[Preparation of Polyarylate Resin (Resin-1)]

A three-necked flask was used as a reaction vessel. The reaction vessel was a 1-L three-necked flask equipped with a thermometer, a three-way cock, and a 200-mL dripping funnel. The reaction vessel was charged with 12.24 g (41.28 millimoles) of 1,1-bis(4-hydroxy-3-methylphenyl)cyclohexane, 0.062 g (0.413 millimoles) of t-butyl phenol, 3.92 g (98 millimoles) of sodium hydroxide, and 0.120 g (0.384 millimoles) of benzyltributylammonium chloride. The reaction vessel was purged with argon then. Thereafter, 300 ml of water was added to the reaction vessel. The internal temperature of the reaction vessel was increased to 50° C. The contents of the reaction vessel was stirred for one hour while the internal temperature of the reaction vessel was kept at 50° C. The internal temperature of the reaction vessel was then cooled to 10° C. As a result, an alkaline aqueous solution was yielded.

Separately, 4.10 g (16.2 millimoles) of 2,6-naphthalene dicarboxylic acid dichloride and 4.52 g (16.2 millimoles) of biphenyl-4,4'-dicarboxylic acid dichloride were dissolved in 150 mL of chloroform (Amylene added). As a result, a chloroform solution was yielded.

Next, the chloroform solution was dripped into the alkaline aqueous solution at a slow pace for 110 minutes using a dripping funnel to initiate polymerization reaction. The polymerization reaction was allowed to progress by stirring the contents of the reaction vessel for four hours while the internal temperature of the reaction vessel was adjusted to 15±5° C.

Thereafter, an upper layer (water layer) of the contents of the reaction vessel was removed using a decant to obtain an organic layer. Subsequently, 400 mL of ion exchanged water was added to a 1-L three-necked flask and the obtained organic layer was then added to the three-necked flask. Furthermore, 400 mL of chloroform and 2 mL of acetic acid were added. The contents of the three-necked flask were stirred at room temperature (25° C.) for 30 minutes. Thereafter, an upper layer (water layer) of the contents of the three-necked flask was removed using a decant to obtain an organic layer. The obtained organic layer was washed five times with 1 L of water using a separating funnel. As a result, a washed organic layer was obtained.

The washed organic layer was filtered to obtain a filtrate. Then, 1 L of methanol was added to 1-L Erlenmeyer flask. The resultant filtrate was dripped into the Erlenmeyer flask at a slow pace to yield a precipitate. The precipitate was filtrated through filtration. The obtained precipitate was vacuum-dried for 12 hours at a temperature of 70° C. Through the above processes, a polyarylate resin (Resin-1)

was prepared. The mass yield of the polyarylate resin (Resin-1) was 12.2 g and the percentage yield thereof was 77 mole %.

[Preparation of Polyarylate Resins (Resin-2)-(Resin-14)]

As a starting material of respective polyarylate resins ((Resin-2)-(Resin-14)), 1,1-bis(4-hydroxy-3-methylphenyl)cyclohexane was changed to an aromatic diol. As another starting material of respective polyarylate resins ((Resin-2)-(Resin-14)), 2,6-naphthalene dicarboxylic acid dichloride and biphenyl-4,4'-dicarboxylic acid dichloride were changed to halogenated alkanoyl. Further, the content of the aromatic dicarboxylic acids was changed to that equivalent to a mole fraction of r/(r+t) and the content of the aromatic diols was change to that equivalent to a mole fraction of s/(s+u). The polyarylate resins (Resin-2)-(Resin-14) were prepared according to the same method as for the polyarylate resin (Resin-1) in all aspects other than the above changes.

Next, $^1$H-NMR spectra of the respective prepared polyarylate resins (Resin-1)-(Resin-17) were measured using a proton nuclear magnetic resonance spectrometer (product of JASCO Corporation, 300 MHz). CDCl$_3$ was used as a solvent. Tetramethylsilane (TMS) was used as an internal standard sample. Among the polyarylate resins (Resin-1)-(Resin-17) prepared as above, the polyarylate resins (Resin-1)-(Resin-4) are discussed as typical examples.

FIGS. 2-5 show $^1$H-NMR NMR spectra of the respective polyarylate resins (Resin-1)-(Resin-4). In FIGS. 2-5, the horizontal axis represents chemical shift (unit: ppm) and the vertical axis represents signal strength (unit: arbitrary unit). It was confirmed from the $^1$H-NMR spectra that the polyarylate resins (Resin-1)-(Resin-4) were obtained. Similarly, it was confirmed from $^1$H-NMR spectra that the other polyarylate resins (Resin-5)-(Resin-17) were obtained.

<<Production of Photosensitive Member>>

[Production of Photosensitive Member (A-1)]

The following describes production of a photosensitive member (A-1) of Example 1.

(Formation of Intermediate Layer)

Titanium oxide subjected to surface treatment ("Prototype SMT-A" produced by TAYCA CORPORATION, average primary particle diameter: 10 nm) was prepared first. Specifically, titanium oxide was subjected to surface treatment with alumina and silica and further subjected to surface treatment with methyl hydrogen polysiloxane while being subjected to wet dispersion. Next, 2 parts by mass of the resultant surface-treated titanium oxide and 1 part by mass of a polyamide resin ("Amilan (registered Japanese trademark) CM8000" manufactured by Toray Industries, Inc., quaternary copolyamide resin of polyamide 6, polyamide 12, polyamide 66, and polyamide 610) were added to a solvent containing 10 parts by mass of methanol, 1 part by mass of butanol, and 1 part by mass of toluene. These materials were mixed together four five hours using a bead mill to be dispersed in the solvent. As a result, an application liquid for intermediate layer formation was prepared.

The prepared application liquid for intermediate layer formation was filtered using a filter having a pore size of 5 µm. The application liquid for intermediate layer formation was then applied onto the surface of an aluminum drum-shaped support member (diameter: 30 mm, total length: 246 mm) as a conductive substrate. Subsequently, the applied application liquid for intermediate layer formation was dried for 30 minutes at a temperature of 130° C. to form an intermediate layer (film thickness: 1.5 µm) on the conductive substrate (drum-shaped support member).

(Formation of Charge Generating Layer)

Y-form titanyl phthalocyanine (1.5 parts by mass) and a polyvinyl acetal resin ("S-LEC BX-5" manufactured by Sekisui Chemical Co., Ltd., 1 part by mass) as a base resin were added to a solvent containing propylene glycol monomethyl ether (40 parts by mass) and tetrahydrofuran (40 parts by mass). These materials were mixed together for 12 hours using a bead mill to be dispersed in the solvent, thereby preparing an application liquid for charge generating layer formation. The prepared application liquid for charge generating layer formation was filtered using a filter having a pore size of 3 µm. The obtained filtrate was applied onto the intermediate layer formed as described above through dip coating and dried for five minutes at a temperature of 50° C. Through the above, a charge generating layer (film thickness: 0.3 µm) was formed on the intermediate layer.

(Formation of Charge Transport Layer)

The hole transport material (HTM-1) (50 parts by mass) as a hole transport material, a hindered phenol antioxidant ("IRGANOX (registered Japanese trademark) 1010" manufactured by BASF Japan Ltd., 2 parts by mass) as an additive, and the polyarylate resin (Resin-1) (viscosity average molecular weight: 46,000, 100 parts by mass) as a binder resin were added to a solvent containing 550 parts by mass of tetrahydrofuran and 150 parts by mass of toluene. These materials were mixed for 12 hours to be dispersed in the solvent, thereby preparing an application liquid for charge transport layer formation.

The application liquid for charge transport layer formation was applied onto the charge generating layer in the same manner as that to apply the application liquid for charge generating layer formation. The applied application liquid for charge transport layer formation was dried for 40 minutes at a temperature of 120° C. to form a charge transport layer (film thickness: 20 µm) on the charge generating layer. Through the above, a photosensitive member (A-1) was produced. The photosensitive member (A-1) had a configuration in which the intermediate layer, the charge generating layer, and the charge transport layer were layered on the conductive substrate in stated order.

[Photosensitive Members (A-2)-(A-22) and (B-1)]

Photosensitive members (A-2)-(A-22) and (B-1) were produced according to the same method as for the photosensitive member (A-1) in all aspects other than that respective hole transport materials listed in Table 1 were used in place of the hole transport material (HTM-1) and respective polyarylate resins listed in Table 1 were used in place of the polyarylate resin (Resin-1) as a binder resin.

[Photosensitive Member (A-23)]

A photosensitive member (A-23) was produced according to the same method as for the photosensitive member (A-1) in all aspects other than the following changes. The time period for dispersing the application liquid for charge generating layer formation was changed from 12 hours to two hours. In preparation of the application liquid for charge transport layer formation, the polyarylate resin (Resin-2) was used in place of the polyarylate resin (Resin-1). Also, 5 parts by mass of meta-terphenyl was used in place of 2 parts by mass of the hindered phenol antioxidant as an additive and 600 parts by mass of tetrahydrofuran and 100 parts by mass of toluene were used in place of 550 parts by mass of tetrahydrofuran and 150 parts by mass of toluene as a solvent. Further, the application liquid for charge transport layer formation was allowed to stand still for 30 days before the prepared application liquid for charge transport layer formation was applied onto the charge generating layer. Drying condition after application of the application liquid for charge transport layer formation onto the charge generating layer was changed from the conditions of a temperature of 120° C. and a time period of 40 minutes to conditions under which temperature was increased for 60 minutes at a heating rate of +1° C./min so that a starting temperature of 60° C. reaches a final attainment temperature of 120° C.).

[Photosensitive Members (A-24)-(A-26)]

Photosensitive members (A-24)-(A-26) were produced according to the same method as for the photosensitive member (A-23) in all aspects other than that polyarylate resins listed in Table 1 were used in place of the polyarylate resin (Resin-2).

[Photosensitive Member (B-1)]

A photosensitive member (B-1) was produced according to the same method as for the photosensitive member (A-1) in all aspects other than that a polyarylate resin including repeating units represented by chemical formula (Resin-B1) (also referred to below as a polyarylate resin (Resin-B1)) was used in place of the polyarylate resin (Resin-1) as a binder resin.

minutes at a temperature of 120° C., thereby producing an abrasion resistance evaluation test sheet on which a charge transport layer having a thickness of 30 μm was formed. In abrasion resistance evaluation for the photosensitive members (A-23)-(A-26), 0.05 parts by mass of a leveling agent (dimethyl silicone oil, "KF96-50CS" manufactured by Shin-Etsu Chemical Co., Ltd.) was further added to the application liquids for charge transport layer formation prepared in production of the respective photosensitive members (A-23)-(A-26) for preparation.

The charge transport layer was peeled off from the polypropylene sheet and attached to a specimen mounting card ("S-36" manufactured by TABER Industries), thereby fabricating a sample. The fabricated sample was set in a rotary ablation tester (manufactured by Toyo Seiki Seisaku-sho, Ltd.) and rotated 1,000 rotations at a load of 500 gf and a rotational speed of 60 rpm using a wear ring ("CS-10"

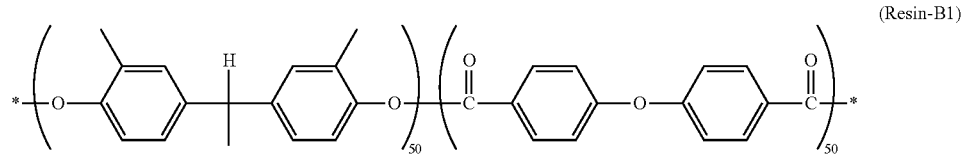
(Resin-B1)

[Performance Evaluation of Photosensitive Member]

(Electrical Characteristics Evaluation)

(Measurement of Charge Potential $V_0$)

The surface potentials of the respective photosensitive members (A-1)-(A-26) and (B-1) at an electric current flowing into drum of −10 μA were measured using a drum sensitivity test device (manufactured by Gen-Tech, Inc.) at a rotational speed of 31 rpm. The measured surface potentials were each determined to be a charge potential ($V_0$). The measurement was performed in an environment of a temperature of 23° C. and a humidity of 50% RH.

(Measurement of Sensitivity Potential $V_L$)

Each of the photosensitive members (A-1)-(A-26) and (B-1) was charged up to −600 V using a drum sensitivity test device (manufactured by Gen-Tech, Inc.) at a rotational speed of 31 rpm. Monochromatic light (wavelength: 780 nm, exposure amount: 0.8 μJ/cm$^2$) was taken out from light of a halogen lamp using a bandpass filter and used to irradiate the surface of the photosensitive member. The surface potential of the photosensitive members was measured after elapse of 80 ms from the monochromatic light irradiation. The measured surface potential was determined to be a sensitivity potential ($V_L$). The measurement was performed in an environment of a temperature of 23° C. and a relative humidity of 50% RH.

(Abrasion Resistance Evaluation of Photosensitive Member)

The application liquid for charge transport layer formation prepared in production of each of the photosensitive members (A-1)-(A-22) and (B-1) was applied onto a polypropylene sheet (thickness: 0.3 mm) wound around an aluminum pipe (diameter: 78 mm). The aluminum pipe around which the sheet with the application liquid for charge transport layer formation was wound was dried for 40 manufactured by TABER Industries) for an abrasion evaluation test. The abrasion loss (mg/1000 rotations) that is mass variation of the sample between before and after the abrasion evaluation test was measured. Abrasion resistance of the photosensitive member was evaluated based on the measured abrasion loss.

(Evaluation of Liquid Life of Application Liquids for Charge Transport Layer Formation)

The application liquid for charge transport layer formation for each of the photosensitive members (A-1)-(A-26) and (B-1) was allowed to stand still for 30 days, and occurrence of gelation therein was confirmed through visual observation. Liquid life was evaluated from the results of confirmation through the visual observation in accordance with the following criteria.

(Evaluation Standard of Liquid Life)

A (Good): No gelation occurred in the application liquid for charge transport layer formation.

B (Mediocre): Slight gelation occurred in the application liquid for charge transport layer formation.

C (Poor): Gelation occurred in the application liquid for charge transport layer formation.

Table 1 indicates configurations and results of performance evaluation of the respective photosensitive members (A-1)-(A-26) and (B-1). In Table 1, HTM-1-HTM-9 in "Hole Transport Material" represent the hole transport materials (HTM-1)-(HTM-9), respectively. "Molecular weight" in "Binder resin" represents a viscosity average molecular weight. Resin-1-Resin-17 and Resin-B1 in "type" of "Binder resin" represent the polyarylate resins (Resin-1)-(Resin-17) and (Resin-B1), respectively.

TABLE 1

| Photosensitive layer | Hole transport material | Charge transport layer | | Electric characteristics | | Abrasion resistance | |
| --- | --- | --- | --- | --- | --- | --- | --- |
| | | Binder resin | | $V_0$ | $V_L$ | Abrasion loss | Liquid |
| | | Type | Molecular weight | (V) | (V) | (mg/1000 rotations) | life |
| A-1 | HTM-1 | Resin-1 | 46,000 | −689 | −55 | 3.4 | A |
| A-2 | HTM-2 | Resin-1 | 46,000 | −660 | −50 | 3.2 | A |
| A-3 | HTM-3 | Resin-1 | 46,000 | −663 | −55 | 3.2 | A |
| A-4 | HTM-4 | Resin-1 | 46,000 | −645 | −53 | 3.6 | A |
| A-5 | HTM-5 | Resin-1 | 46,000 | −657 | −39 | 3.5 | A |
| A-6 | HTM-6 | Resin-1 | 46,000 | −645 | −43 | 3.6 | A |
| A-7 | HTM-7 | Resin-1 | 46,000 | −668 | −53 | 4.0 | A |
| A-8 | HTM-8 | Resin-1 | 46,000 | −674 | −86 | 3.5 | A |
| A-9 | HTM-9 | Resin-1 | 46,000 | −659 | −64 | 3.8 | A |
| A-10 | HTM-1 | Resin-2 | 47.500 | −656 | −53 | 3.5 | A |
| A-11 | HTM-1 | Resin-3 | 46,500 | −649 | −50 | 4.3 | A |
| A-12 | HTM-1 | Resin-4 | 48,200 | −665 | −56 | 4.3 | A |
| A-13 | HTM-1 | Resin-5 | 49,000 | −649 | −55 | 4.6 | B |
| A-14 | HTM-1 | Resin-6 | 47,600 | −671 | −52 | 3.0 | B |
| A-15 | HTM-1 | Resin-7 | 45,800 | −680 | −54 | 3.5 | A |
| A-16 | HTM-1 | Resin-8 | 49,800 | −673 | −57 | 3.6 | A |
| A-17 | HTM-1 | Resin-9 | 50,200 | −690 | −53 | 3.4 | A |
| A-18 | HTM-1 | Resin-10 | 49,600 | −685 | −55 | 4.6 | A |
| A-19 | HTM-1 | Resin-11 | 50,700 | −678 | −58 | 3.7 | A |
| A-20 | HTM-1 | Resin-12 | 47,100 | −655 | −52 | 3.3 | A |
| A-21 | HTM-1 | Resin-13 | 47,200 | −660 | −58 | 3.2 | B |
| A-22 | HTM-1 | Resin-14 | 46,400 | −682 | −54 | 3.6 | B |
| A-23 | HTM-1 | Resin-2 | 48,500 | −680 | −69 | 3.6 | A |
| A-24 | HTM-1 | Resin-15 | 47,600 | −667 | −58 | 4.1 | A |
| A-25 | HTM-1 | Resin-16 | 49,100 | −675 | −60 | 4.3 | B |
| A-26 | HTM-1 | Resin-17 | 48,700 | −663 | −65 | 3.6 | A |
| B-1 | HTM-1 | Resin-B1 | 46,500 | −669 | −52 | 6.4 | A |

As indicated in Table 1, the charge transport layers of the photosensitive members (A-1)-(A-26) each contained any of the polyarylate resins (Resin-1)-(Resin-17) as a binder resin. The polyarylate resins (Resin-1)-(Resin-17) each included the repeating units represented in general formula (1). As indicated in Table 1, the photosensitive members (A-1)-(A-26) each had an abrasion loss of at least 3.0 mg and no greater than 4.6 mg.

As indicated in Table 1, the charge transport layer of the photosensitive member (B-1) contained the polyarylate resin (Resin-B1) as a binder resin. The polyarylate resin (Resin-B1) did not include the repeating units represented in general formula (1). As indicated in Table 1, the abrasion loss of the photosensitive member (B-1) was 6.4 mg.

As cleared from Table 1, the photosensitive member according to the present embodiment (photosensitive members (A-1)-(A-26)) has smaller abrasion loss than the photosensitive member (B-1) in the abrasion resistance test. Thus, it is clear that the photosensitive member according to the present disclosure is excellent in abrasion resistance.

As indicated in Table 1, the photosensitive layers of the photosensitive members (A-10), (A-19), and (A-20) contained the polyarylate resins (Resin-2), (Resin-11), and (Resin-12), respectively, as a binder resin. In these binder resins, r/(r+t) and s/(s+u) each are at least 0.20 and no greater than 0.80. Abrasion losses of the photosensitive members (A-2), (A-19), and (A-20) each were at least 3.3 mg and no greater than 3.7 mg and the photosensitive members (A-2), (A-19), and (A-20) are all evaluated as A (Good) in the liquid life evaluation.

As indicated in Table 1, the photosensitive layers of the photosensitive members (A-13), (A-18), and (A-21) contained the polyarylate resins (Resin-5), (Resin-10), and (Resin-13), respectively, as a binder resin. In these binder resins, r/(r+t) and s/(s+u) each were not at least 0.20 and no greater than 0.80. The photosensitive members (A-13) and (A-21) were evaluated as B (Mediocre) in the liquid life evaluation. Abrasion losses of the respective photosensitive members (A-13) and (A-18) each were 4.6 mg.

It is clear that the photosensitive members (A-10), (A-19), and (A-20) are more excellent in abrasion resistance and liquid life than the photosensitive members (A-13), (A-18), and (A-21).

As indicated in Table 1, the photosensitive layers of the photosensitive members (A-1), (A-10), and (A-15)-(A-17) contained the polyarylate resins (Resin-1), (Resin-2), and (Resin-7)-(Resin-9), respectively, as a binder resin. Y in these polyarylate resins represented a divalent group represented by general formula (4). Abrasion losses of the photosensitive members (A-1), (A-10), and (A-15)-(A-17) each were at least 3.0 mg and no greater than 3.6 mg.

As indicated in Table 1, the photosensitive layers of the photosensitive members (A-11)-(A-14) contained the polyarylate resins (Resin-3)-(Resin-6), respectively, as a binder resin. Y in the respective polyarylate resins did not represent a divalent group represented by general formula (4). Abrasion losses of the respective photosensitive members (A-11)-(A-13) each were at least 4.3 mg and no greater than 4.6 mg. The photosensitive members (A-13) and (A-14) were each evaluated as B (Mediocre) in the liquid life evaluation.

It is apparent that the photosensitive members (A-1), (A-10), and (A-15)-(A-17) are more excellent in abrasion resistance and liquid life than the photosensitive members (A-11)-(A-14).

What is claimed is:
1. An electrophotographic photosensitive member comprising a conductive substrate and a photosensitive layer, wherein the photosensitive layer contains a charge generating material, a hole transport material, and a binder resin, the binder resin contains a polyarylate resin represented by chemical formula (Resin-2) and having a viscosity average molecular weight of at least 10,000 and no greater than 51,000, and the hole transport material contains a compound represented by general formula (2),

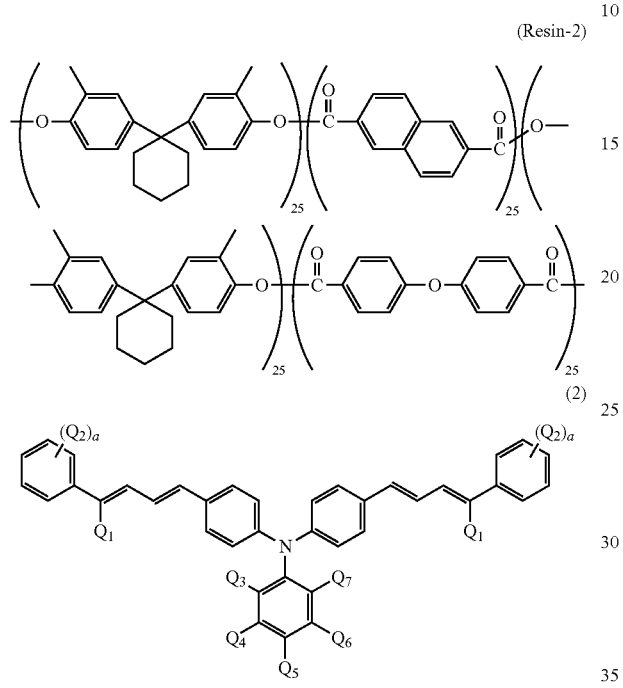

where, in the general formula (2), $Q_1$ represents a hydrogen atom, an alkyl group having 1 to 8 carbon atoms, an alkoxy group having 1 to 8 carbon atoms, or a phenyl group optionally substituted with an alkyl group having 1 to 8 carbon atoms, $Q_2$ represents an alkyl group having 1 to 8 carbon atoms, an alkoxy group having 1 to 8 carbon atoms, or a phenyl group, $Q_3$, $Q_4$, $Q_5$, $Q_6$, and $Q_7$ each represent, independently of one another, a hydrogen atom, an alkyl group having 1 to 8 carbon atoms, an alkoxy group having 1 to 8 carbon atoms, or a phenyl group, adjacent two of $Q_3$, $Q_4$, $Q_5$, $Q_6$, and $Q_7$ optionally bond together to form a ring, a represents an integer of at least 0 and no greater than 5, and when a represents an integer of at least 2 and no greater than 5, chemical groups $Q_2$ bonded to the same phenyl group are the same or different from one another.

2. The electrophotographic photosensitive member according to claim 1, wherein in the general formula (2), $Q_1$ represents a hydrogen atom or a phenyl group substituted with an alkyl group having 1 to 8 carbon atoms, $Q_2$ represents an alkyl group having 1 to 8 carbon atoms, $Q_3$, $Q_4$, $Q_5$, $Q_6$, and $Q_7$ each represent, independently of one another, a hydrogen atom, an alkyl group having 1 to 8 carbon atoms, or an alkoxy group having 1 to 8 carbon atoms, adjacent two of $Q_3$, $Q_4$, $Q_5$, $Q_6$, and $Q_7$ optionally bond together to form a ring, and a represents 0 or 1.

3. The electrophotographic photosensitive member according to claim 1, wherein the hole transport material is represented by chemical formula (HTM-1)

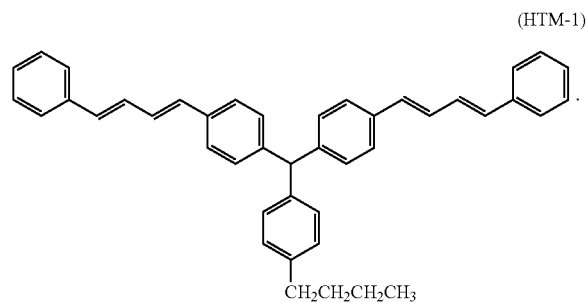

4. The electrophotographic photosensitive member according to claim 1, wherein the photosensitive layer includes a charge generating layer that contains the charge generating material and a charge transport layer that contains the hole transport material and the binder resin, and the charge transport layer is a single-layer charge transport layer and disposed as a topmost layer.

5. The electrophotographic photosensitive member according to claim 1, wherein chemical groups $Q_1$ in the general formula (2) each represents a hydrogen atom.

* * * * *